(12) United States Patent
Kaneko

(10) Patent No.: US 7,139,451 B2
(45) Date of Patent: Nov. 21, 2006

(54) ARRAYED WAVEGUIDE GRADING WITH OPTICAL INPUT AND OUTPUT CHARACTERISTICS SETTABLE TO DESIRED VALUES

(75) Inventor: Tarou Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/452,256

(22) Filed: Jun. 3, 2003

(65) Prior Publication Data

US 2003/0210858 A1 Nov. 13, 2003

Related U.S. Application Data

(62) Division of application No. 09/987,459, filed on Nov. 14, 2001, now Pat. No. 6,679,748.

(30) Foreign Application Priority Data

Nov. 16, 2000 (JP) ............................... 2000-348870

(51) Int. Cl.
*G02B 6/28* (2006.01)
(52) U.S. Cl. .............................. 385/24; 385/37; 385/16
(58) Field of Classification Search .................. 385/24, 385/37, 43
See application file for complete search history.

(56) References Cited

U.S. PATENT DOCUMENTS

| | | | | |
|---|---|---|---|---|
| 5,841,919 A | * | 11/1998 | Akiba et al. | 385/37 |
| 5,901,259 A | | 5/1999 | Ando et al. | 385/16 |
| 6,181,849 B1 | * | 1/2001 | Lin et al. | 385/24 |
| 6,205,273 B1 | | 3/2001 | Chen | 385/37 |
| 6,389,201 B1 | * | 5/2002 | Urino | 385/43 |
| 6,418,249 B1 | * | 7/2002 | Nakamura et al. | 385/24 |
| 6,442,311 B1 | * | 8/2002 | Barbarossa et al. | 385/37 |

FOREIGN PATENT DOCUMENTS

| | | |
|---|---|---|
| JP | 04-213407 | 8/1992 |
| JP | 07-049430 | 2/1995 |
| JP | 07-063934 | 3/1995 |
| JP | 08-262243 | 10/1996 |
| JP | 10-197735 | 7/1998 |
| JP | 10-206663 | 8/1998 |
| JP | 2000-089263 | 3/2000 |
| JP | 2000-98177 | 4/2000 |
| JP | 2000-171648 | 6/2000 |
| JP | 2000-221350 | 8/2000 |
| JP | 2000-235123 | 8/2000 |
| JP | 2000-258647 | 9/2000 |
| JP | 2002-014243 | 1/2002 |
| JP | 2002-082238 | 3/2002 |

OTHER PUBLICATIONS

Japanese Office Action dated Nov. 4, 2003 with a patial English translation.
Japanese Office Action dated Jan. 27, 2004 with a partial English translation.

* cited by examiner

*Primary Examiner*—Frank G. Font
*Assistant Examiner*—Eric Wong
(74) *Attorney, Agent, or Firm*—McGinn IP Law Group PLLC

(57) ABSTRACT

A waveguide device has an input waveguide, a plurality of output waveguides, a channel waveguide array, an input slab waveguide, and an output slab waveguide. The output slab waveguide connects an output end of the channel waveguide array to the output waveguide, and has optical input/output characteristics set to given ratios for the output waveguides with respect to the input waveguides. The waveguide device is capable of adjusting signal levels output from the respective waveguides without the need for circuit parts for compensating for loss differences and also the need for a process of highly accurately attaching parts.

22 Claims, 11 Drawing Sheets

FIG.7
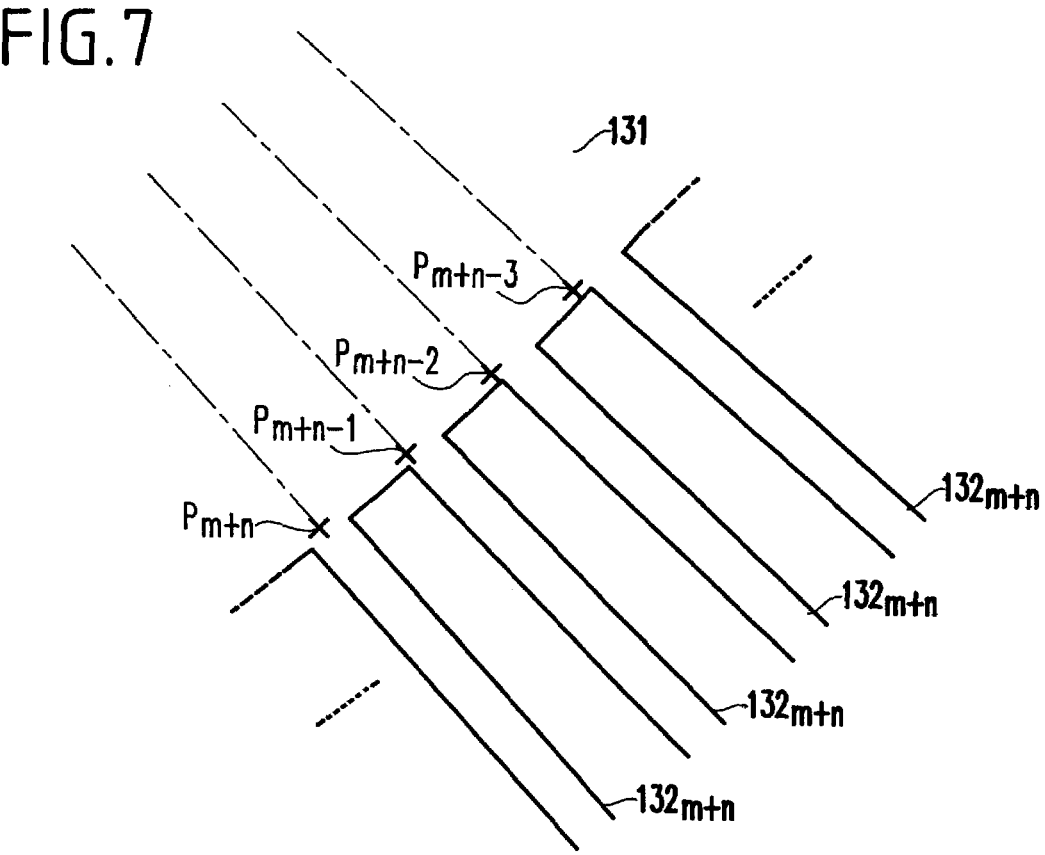
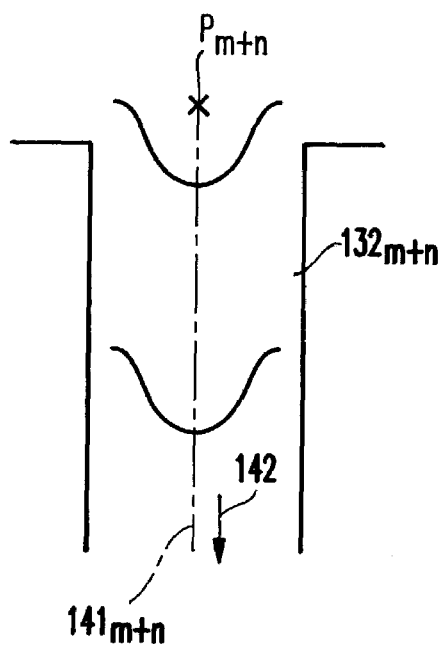
FIG.8
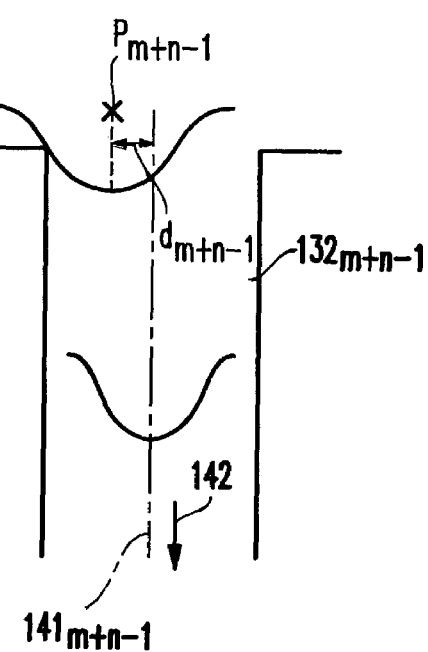
FIG.9

ARRAYED WAVEGUIDE GRADING WITH OPTICAL INPUT AND OUTPUT CHARACTERISTICS SETTABLE TO DESIRED VALUES

The present Application is a Divisional Application of U.S. patent application Ser. No. 09/987,459 filed on Nov. 14, 2001 now U.S. Pat. No. 6,679,748.

BACKGROUND OF THE INVENTION

1. Field of the Invention

The present invention relates to an arrayed waveguide grating or a waveguide device having a slab waveguide, a demultiplexer or a multiplexer which employs an arrayed waveguide grating or a waveguide device, and an optical communication system which employs an arrayed waveguide grating or a waveguide device or a demultiplexer or a multiplexer.

2. Description of the Related Art

As the volume of data to be transmitted over an optical fiber communication system increases, it is desired that the optical fiber communication system have an increased capacity for data transmission. In view of such a demand, growing importance is attached to optical wavelength filters for use as multiplexing and demultiplexing devices for multiplexing and demultiplexing wavelengths in DWDM (Dense Wavelength Division Multiplexing) communication systems.

Optical wavelength filters are available in various types. Of the various wavelength filters, an arrayed waveguide grating (AWG) has a narrow wavelength band and a high extinction ratio, and has features as a multi-input, multi-output filter device. The arrayed waveguide grating is capable of demultiplexing multiplexed signals and multiplexing signals, and can easily be used to make up wavelength multiplexing and demultiplexing devices.

FIG. 1 of the accompanying drawings shows an overall arrangement of a conventional arrayed waveguide grating. As shown in FIG. 1, the conventional arrayed waveguide grating, generally denoted by 11, comprises substrate 12, one or plural input waveguides 13 disposed on substrate 12, a plurality of output waveguides 14 disposed on substrate 12, channel waveguide array 15 disposed on substrate 12, and curved in a certain direction with respective curvatures, inlet slab waveguide 16 disposed on substrate 12, and connecting input waveguides 13 to channel waveguide array 15, and outlet slab waveguide 17 disposed on substrate 12, and connecting channel waveguide array 15 to output waveguides 14. Multiplexed signal light entered from input waveguides 13 is spread by inlet slab waveguide 16, and enters into channel waveguide array 15.

Channel waveguide array 15 comprises a plurality of arrayed waveguides having respective different optical path lengths which are successively longer or shorter. Therefore, signal light beams guided through the respective arrayed waveguides couple in respective different phases spaced at certain intervals to the outlet slab waveguide 17. Since the signal light beams actually suffer chromatic dispersion, the cophasal surfaces of the signal light beams are inclined depending on the wavelength. As a result, the signal light beams are focused (converged) at different positions corresponding to the difference wavelengths on the interface between the outlet slab waveguide 17 and the output waveguides 14. Since the output waveguides 14 are disposed in the respective positions corresponding to the difference wavelengths, desired wavelengths can be extracted from the respective output waveguides 14. The slab waveguides are disclosed in Japanese laid-open patent publication No. 7-63934, for example. The general technique of multiplexing and demultiplexing optical signals is disclosed in Japanese laid-open patent publication No. 7-49430, for example.

With the conventional arrayed waveguide grating 11 shown in FIG. 1, the light emitted from channel waveguide array 15 into outlet slab waveguide 17 reaches output waveguides 14 that is connected to the output side of outlet slab waveguide 17. In output waveguides 14, the intensity of the light is greater progressively toward the central ones of output waveguides 14, and smaller progressively toward the peripheral ones of output waveguides 14.

Heretofore, it has been proposed to uniformize the levels of the optical signals thereby to uniform the levels of the optical signals that are detected from the output waveguides. According to one proposal, in order to adjust the levels of the optical signals that are detected from the output waveguides, attenuators for compensating loss differences are individually connected to the respective output waveguides, thus making up an attenuator. However, it is necessary to prepare as many resistors having different resistances as the number of the different levels of the optical signals that are detected from the output waveguides. Furthermore, since the attenuation levels of the attenuators vary depending on the temperature, it is necessary to use a temperature compensation circuit in combination with the attenuators. The arrayed waveguide grating with such attenuators for compensating loss differences is not practical as to cost and space.

An arrayed waveguide grating which is designed to extract a monitor signal using higher-order diffracted light tends to cause a large detected light level difference because a waveguide for guiding the monitor signal is positioned away from the optical axis of light emitted from a channel waveguide array. Consequently, the arrayed waveguide grating needs a structure for compensating for a signal level loss before or after the signal light is detected.

Japanese laid-open patent publication No. 2000-98177 discloses a device having an optical waveguide with a plurality of ports and an optical fiber array. Deviations between the ports and the propagation axes of the optical fibers of the optical fiber array are managed to set transmission losses between the ports of the optical waveguide to desired values. Though the disclosed arrangement does not need an external attenuator, it poses yield and cost problems because of the need for fine adjustment of the propagation axes.

While the drawbacks of the conventional arrayed waveguide gratings have been described above, multiplexers for multiplexing optical signals and demultiplexers for demultiplexing optical signals which employ the conventional arrayed waveguide gratings, and optical communication systems which employ the conventional arrayed waveguide gratings and the multiplexers and demultiplexers are also problematic in that they are complex in structure and large in size, and cannot be reduced in cost.

SUMMARY OF THE INVENTION

It is therefore an object of the present invention to provide an arrayed waveguide grating which is capable of adjusting signal levels output from respective waveguides without the need for circuit parts for compensating for loss differences and also the need for a process of highly accurately attaching parts, and a multiplexer, a demultiplexer, and an optical communication system which use such an arrayed waveguide grating.

According to a first aspect of the present invention, an arrayed waveguide grating comprises: one or plural input waveguides for inputting signal lights; a plurality of output waveguides for outputting signal lights; a channel waveguide array having waveguides which are successively longer with predetermined waveguide length differences; an input slab waveguide connecting an input end of the channel waveguide array to the input waveguides; and an output slab waveguide connecting an output end of the channel waveguide array to the output waveguides, and having optical input/output characteristics set to predetermined ratios for the respective output waveguides with respect to the input waveguides.

The first aspect of the present invention is concerned with the demultiplexing of light, and optical input/output characteristics are set to predetermined ratios for the respective output waveguides with respect to the input waveguides. This makes it unnecessary to employ external circuit parts for compensating for loss differences.

According to a second aspect of the present invention, an arrayed waveguide grating comprises: one or plural input waveguides for inputting signal lights; a plurality of output waveguides for outputting signal lights; a channel waveguide array having waveguides which are successively longer with predetermined waveguide length differences; an input slab waveguide connecting an input end of the channel waveguide array to the input waveguides; and an output slab waveguide connecting an output end of the channel waveguide array to the output waveguides, and having optical input/output characteristics set to predetermined ratios for the respective output waveguides with respect to the input waveguides depending on the differences between optical losses along respective paths in the output slab waveguide.

The second aspect of the present invention is concerned with the demultiplexing of light, optical loss differences are developed at a boundary of the slab waveguide for thereby setting optical input/output characteristics predetermined ratios for the respective output waveguides with respect to the input waveguides. This makes it unnecessary to employ external circuit parts for compensating for loss differences.

According to a third aspect of the present invention, an arrayed waveguide grating comprises: a plurality of input waveguides for inputting signal lights having different wavelengths each other; one or plural output waveguides for outputting signal lights; a channel waveguide array having waveguides which are successively longer with predetermined waveguide length differences; an output slab waveguide connecting an output end of the channel waveguide array to the output waveguides; and an input slab waveguide connecting an input end of the channel waveguide array to the input waveguides, and having optical input/output characteristics set to predetermined ratios for the respective input waveguides corresponding to the output waveguides.

Unlike the first aspect of the present invention, the third aspect of the present invention is concerned with the multiplexing of lights, and optical input/output characteristics are set to predetermined ratios for the respective input waveguides with respect to the output waveguides. This makes it unnecessary to employ external circuit parts for compensating for loss differences.

According to a fourth aspect of the present invention, an arrayed waveguide grating comprises: a plurality of input waveguides for inputting signal lights having different wavelengths each other; one or plural output waveguides for outputting signal lights; a channel waveguide array having waveguides which are successively longer with predetermined waveguide length differences; an output slab waveguide connecting an output end of the channel waveguide array to the output waveguides; and an input slab waveguide connecting an input end of the channel waveguide array to the input waveguides; and having optical input/output characteristics set to predetermined ratios for the respective input waveguides corresponding to the output waveguides depending on the differences between optical losses along respective paths in the output slab waveguide.

Unlike the second aspect of the present invention, the fourth aspect of the present invention is concerned with the multiplexing of lights, and optical loss differences are developed at boundaries of the input waveguides and the slab waveguide for thereby setting optical input/output characteristics predetermined ratios for the respective input waveguides with respect to the output waveguides. This makes it unnecessary to employ external circuit parts for compensating for loss differences.

According to a fifth aspect of the present invention, an arrayed waveguide grating comprises: one or plural input waveguides for inputting signal lights; a plurality of output waveguides for outputting signal lights; a channel waveguide array having waveguides which are successively longer with predetermined waveguide length differences; an input slab waveguide connecting an input end of the channel waveguide array to the input waveguides; and an output slab waveguide connecting an output end of the channel waveguide array to the output waveguides, the output slab waveguide having a core layer disposed therein for propagating light therethrough, the core layer being partly cut off in selected or all paths therein which interconnect the channel waveguide array and the output waveguides, and a cladding layer disposed in cut regions of the core layer and on opposite sides of the core layer, the cut regions in the paths having cut lengths set to predetermined values in the direction in which the signal lights propagate, depending on optical losses of the signal lights propagated in the paths.

With the fifth aspect of the present invention, the core layer of the slab waveguide is partly cut off as required, and the optical losses with respect to the output waveguides at the time of demultiplexing the light signal are adjusted based on the lengths of the cut regions.

According to a sixth aspect of the present invention, an arrayed waveguide grating comprises: a plurality of input waveguides for inputting signal lights having different wavelengths each other; one or plural output waveguides for outputting signal lights; a channel waveguide array having waveguides which are successively longer with predetermined waveguide length differences; an output slab waveguide connecting an output end of the channel waveguide array to the output waveguides; and an input slab waveguide connecting an input end of the channel waveguide array to the input waveguides, the input slab waveguide having a core layer disposed therein for propagating light therethrough, the core layer being partly cut off in selected or all paths therein which interconnect the channel waveguide array and the input waveguides, and a cladding layer disposed in cut regions of the core layer and on opposite sides of the core layer, the cut regions in the paths having cut lengths set to predetermined values in the direction in which the signal lights propagate, depending on optical losses of the signal lights propagated in the paths.

With the sixth aspect of the present invention, the core layer of the slab waveguide is partly cut off as required, and the optical losses of the signal lights to be multiplexed into the output waveguides are adjusted based on the lengths of the cut regions.

According to a seventh aspect of the present invention, an arrayed waveguide grating comprises: one or plural input waveguides for inputting signal lights; a plurality of output waveguides for outputting signal lights; the output waveguides having at least one core layer disposed therein for propagating light therethrough, the core layer being partly cut off, and a cladding layer disposed in cut regions of the core layer and on opposite sides of the core layer, the cut regions having cut lengths set to predetermined values depending on optical losses of the signal lights propagated in the output waveguides; a channel waveguide array having waveguides which are successively longer with predetermined waveguide length differences; an input slab waveguide connecting an input end of the channel waveguide array to the input waveguides; and an output slab waveguide connecting an output end of the channel waveguide array to the output waveguides.

With the seventh aspect of the present invention, whereas the core layer of the slab waveguide is partly cut off as required with the fifth aspect of the present invention, the core layer of some or all of the output waveguides for propagating the signal lights output from the slab waveguide is partly cut off as required, and the optical losses with respect to the output waveguides are adjusted based on the lengths of the cut regions.

According to an eighth aspect of the present invention, an arrayed waveguide grating comprises: a plurality of input waveguides for inputting signal lights having different wavelengths each other, the input waveguides having at least one core layer disposed therein for propagating light therethrough, the core layer being partly cut off, and a cladding layer disposed in cut regions of the core layer and on opposite sides of the core layer, the cut regions having cut lengths set to predetermined values depending on optical losses of the signal lights propagated in the input waveguides; one or plural output waveguides for outputting signal lights; a channel waveguide array having waveguides which are successively longer with predetermined waveguide length differences, an input slab waveguide connecting an input end of the channel waveguide array to the input waveguides; and an output slab waveguide connecting an output end of the channel waveguide array to the output waveguides.

With the eighth aspect of the present invention, whereas the core layer of the slab waveguide is partly cut off as required with the sixth aspect of the present invention, the core layer of some or all of the input waveguides for transmitting the signal lights into the slab waveguide is partly cut off as required, and the optical losses with respect to the input waveguides are adjusted based on the lengths of the cut regions.

According to a ninth aspect of the present invention, an arrayed waveguide grating comprises: one or plural input waveguides for inputting signal lights; a channel waveguide array having waveguides which are successively longer with predetermined waveguide length differences; an input slab waveguide connecting an input end of the channel waveguide array to the input waveguides; an output slab waveguide connecting an output end of the channel waveguide array to the input end thereof; and a plurality of output waveguides having respective ends connected to the output end of the output slab waveguide, wherein selected or all of the ends of the output waveguides have respective central positions displaced from corresponding focused positions in a direction perpendicular to central axes of the output waveguides by predetermined values depending on losses to be given to the signal lights propagated in the output waveguides.

Usually, the focused positions located in the vicinity of the boundary of the slab waveguide at its output end are aligned with the central axes of the output waveguides to increase the coupling efficiency. With the ninth aspect of the present invention, the central positions of the ends of the output waveguides which face the slab waveguide are displaced from the corresponding focused positions in the direction perpendicular to the central axes of the output waveguides by predetermined values depending on losses to be given to the signal lights propagated in the output waveguides, thereby adjusting the losses of the signal lights propagated in the output waveguides.

According to a tenth aspect of the present invention, an arrayed waveguide grating comprises: a channel waveguide array having waveguides which are successively longer with predetermined waveguide length differences; an input slab waveguide having an output end connected to an input end of the channel waveguide array; one or plural output waveguides for outputting signal lights; an output slab waveguide connecting an output end of the channel waveguide array to the output waveguides; and a plurality of input waveguides having respective ends connected to the input end of the input slab waveguide, wherein selected or all of the ends of the input waveguides have respective central positions displaced from corresponding focused positions in a direction perpendicular to central axes of the input waveguides by predetermined values depending on losses to be given to the signal lights propagated in the output waveguides.

Usually, the central axis of an output waveguide for extracting a multiplexed signal is aligned with the optical axe of the multiplexed signal coupled to the output waveguide to increase the total efficiency. With the tenth aspect of the present invention, the input waveguides are displaced in the direction perpendicular to the central axes thereof to shift the propagation axes of the signal lights coupled to the output waveguides depending on losses to be given to the signal lights propagated in the output waveguides. The losses of the signal lights propagated in the output waveguides are adjusted based on the distances by which the input waveguides are displaced.

According to an eleventh aspect of the present invention, an arrayed waveguide grating comprises: a channel waveguide array having waveguides which are successively longer with predetermined waveguide length differences; an input slab waveguide having an output end connected to an input end of the channel waveguide array; one or plural input waveguides for inputting signal lights, the input waveguides having output ends connected to an input end of the input slab waveguide; an output slab waveguide having an input end connected to an output end of the channel waveguide array; and a plurality of output waveguides having respective ends connected to the output end of the output slab waveguide, wherein selected or all of central axes of the output waveguides are inclined at the interconnected points of the output waveguides and the channel waveguide array at respective angles depending on losses to be given to the signal lights coupled at the interconnected points.

With the eleventh aspect of the present invention, the angles between the central axes of the output waveguides for extracting demultiplexed signal lights and the propagation axes of the demultiplexed signal lights coupled to the respective output waveguides are set depending on losses to be given to the signal lights, for thereby adjusting the losses of the signal lights propagated in the output waveguides.

According to a twelfth aspect of the present invention, an arrayed waveguide grating comprises: a channel waveguide array having waveguides which are successively longer with predetermined waveguide length differences; an input slab waveguide having an output end connected to an input end of the channel waveguide array; one or plural output waveguides for outputting signal lights; an output slab waveguide connecting an output end of the channel waveguide array to the output waveguides; and a plurality of input waveguides having respective ends connected to the input end of the input slab waveguide, wherein selected or all of central axes of the input waveguides are inclined at the interconnected points of the input waveguides and the input slab waveguide at respective angles depending on losses to be given to the signal lights coupled at the interconnected points.

With the twelfth aspect of the present invention, the angles between the ends of the input waveguides and the input slab waveguide array and the central axes of the input waveguides set depending on losses to be given to the signal lights, for thereby adjusting the losses of the signal lights transmitted respectively from input waveguides.

According to a thirteenth aspect of the present invention, an arrayed waveguide grating comprises: a channel waveguide array having waveguides which are successively longer with predetermined waveguide length differences; an input slab waveguide having an output end connected to an input end of the channel waveguide array; one or plural input waveguides for inputting signal lights, the input waveguides having output ends connected to an input end of the input slab waveguide; an output slab waveguide having an input end connected to an output end of the channel waveguide array; and a plurality of output waveguides having respective ends connected to the output end of the output slab waveguide, wherein selected or all widths of the output waveguides at ends thereof are set to predetermined values depending on losses to be given to the signal lights.

With the thirteenth aspect of the present invention, the widths, in the direction perpendicular to the propagation axes, of selected or all of the output waveguides at their portions connected to the output slab waveguide are set to values depending on losses to be given to the signal lights, for thereby adjusting the losses of the signal lights propagated in the output waveguides.

According to a fourteenth aspect of the present invention, an arrayed waveguide grating comprises: a channel waveguide array having waveguides which are successively longer with predetermined waveguide length differences; an input slab waveguide having an output end connected to an input end of the channel waveguide array; one or plural output waveguides for outputting signal lights; an output slab waveguide connecting an output end of the channel waveguide array to the output waveguides; and a plurality of input waveguides having respective ends connected to the input end of the input slab waveguide, wherein selected or all widths of the input waveguides at ends thereof are set to predetermined values depending on losses to be given to the signal lights.

With the fourteenth aspect of the present invention, the widths, in the direction perpendicular to the propagation axes, of selected or all of the input waveguides at their portions connected to the input slab waveguide are set to values depending on losses to be given to the signal lights, for thereby adjusting the losses of the signal lights propagated in the input waveguides.

According to a fifteenth aspect of the present invention, an arrayed waveguide grating comprises: a channel waveguide array having waveguides which are successively longer with predetermined waveguide length differences; an input slab waveguide having an output end connected to an input end of the channel waveguide array; one or plural input waveguides for inputting signal-lights, the input waveguides having output ends connected to an input end of the input slab waveguide; an output slab waveguide having an input end connected to an output end of the channel waveguide array; and a plurality of output waveguides having respective ends connected to the output end of the output slab waveguide wherein the ends of the output waveguides and the channel waveguide array are displaced in the direction of propagation axes of the output waveguides depending on losses to be given to the signal lights propagated from the channel waveguide array to the ends of the output waveguides.

Usually, the focused positions located in the vicinity of the boundary of the slab waveguide at its output end are aligned with the central axes of the output waveguides to increase the coupling efficiency to the output waveguides. With the fifteenth aspect of the present invention, the lengths between the ends of the output waveguides and the focused positions are displaced, for some or all of the output waveguides, in the direction of propagation axes of the output waveguides depending on losses to be given to the signal lights propagated to the output waveguides, for thereby adjusting the losses of the signal lights propagated in the output waveguides.

According to a sixteenth aspect of the present invention, an arrayed waveguide grating comprises: a channel waveguide array having waveguides which are successively longer with predetermined waveguide length differences; an input slab waveguide having an output end connected to an input end of the channel waveguide array; one or plural output waveguides for outputting signal lights; an output slab waveguide connecting an output end of the channel waveguide array to the output waveguides; and a plurality of input waveguides having respective ends connected to the input end of the input slab waveguide, wherein the lengths between the ends of the input waveguides and the channel waveguide array are displaced in the direction of propagation axes of the input waveguides depending on losses to be given to the signal lights propagated from the channel waveguide array to the ends of the input waveguides.

Usually, the focused positions located in the vicinity of the boundary of the output slab waveguide and the ends of the output waveguides are aligned to increase the coupling efficiency of the signal lights which are propagated from the input waveguides through the channel waveguide array to the output slab waveguide. With the sixteenth aspect of the present invention, some or all of the input waveguides are displaced from their normal positions in the direction of the propagation axes depending on losses to be given to the signal lights, for thereby adjusting the losses of the signal lights.

According to a seventeenth aspect of the present invention, a demultiplexer comprises: an arrayed waveguide grating comprising one or plural input waveguides for inputting signal lights; a plurality of output waveguides for outputting signal lights; a channel waveguide array having waveguides which are successively longer with predetermined waveguide length differences; an input slab waveguide connecting an input end of the channel waveguide array to the input waveguides; and an output slab waveguide connecting an output end of the channel waveguide array to the output waveguides, and having optical input/output characteristics set to predetermined ratios for the respective output waveguides with respect to the input waveguides; and level adjusting means for being supplied with the signal lights of respective wavelengths from the output waveguides of the arrayed waveguide grating, and adjusting output levels of the signal lights to desired values.

With the seventeenth aspect of the present invention, the arrayed waveguide grating itself sets the optical input/output characteristics to predetermined ratios for the respective output waveguides with respect to the input waveguides, and the level adjusting means is supplied with the signal lights of respective wavelengths from the output waveguides and adjusts output levels of the signal lights to desired values. The input/output characteristics can thus be made flat or freely adjusted depending on an apparatus or system with which the demultiplexer is used.

According to an eighteenth aspect of the present invention, a demultiplexer comprises: an arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides depending on the differences between optical losses along respective paths in the output slab waveguide; and level adjusting means for being supplied with the signal lights of respective wavelengths from the output waveguides of the arrayed waveguide grating, and adjusting output levels of the signal lights to desired values.

With the eighteenth aspect of the present invention, the arrayed waveguide grating itself sets the optical input/output characteristics to predetermined ratios for the respective output waveguides with respect to the input waveguides based on optical loss differences at the boundary of the slab waveguide, and the level adjusting means is supplied with the signal lights of respective wavelengths from the output waveguides and adjusts output levels of the signal lights to desired values. The input/output characteristics-can thus be made flat or freely adjusted depending on an apparatus or system with which the demultiplexer is used.

According to a nineteenth aspect of the present invention, a multiplexer comprises: a plurality of light sources; an arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides; level detecting means for detecting levels of the signal lights input from the light sources to the arrayed waveguide grating; and level adjusting means for comparing the levels of the signal lights detected by the level detecting means with predetermined levels for the respective wavelengths, and adjusting output levels of the light sources to set the levels of the waveguides multiplexed by the arrayed waveguide grating to desired values.

With the nineteenth aspect of the present invention, the arrayed waveguide grating itself sets the optical input/output characteristics to predetermined ratios for the respective input waveguides with respect to the output waveguides, and the levels of the signal lights input from the light sources to the arrayed waveguide grating are detected by the level detecting means. By adjusting the output levels of the light sources, the levels of the signal lights of the respective wavelengths which have been multiplexed by the arrayed waveguide grating are set to desired values. The input/output characteristics can thus be made flat or freely adjusted at the output waveguides depending on an apparatus or system with which the demultiplexer is used.

According to a twentieth aspect of the present invention, a multiplexer comprises: a plurality of light sources; an arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides depending on the differences between optical losses along respective paths in the output slab waveguide; level detecting means for detecting levels of the signal lights input from the light sources to the arrayed waveguide grating; and level adjusting means for comparing the levels of the signal lights detected by the level detecting means with predetermined levels for the respective wavelengths, and adjusting output levels of the light sources to set the levels of the waveguides multiplexed by the arrayed waveguide grating to desired values.

With the twentieth aspect of the present invention, the arrayed waveguide grating itself sets the optical input/output characteristics to predetermined ratios for the respective input waveguides with respect to the output waveguides based on optical loss differences at the boundary of the slab waveguide, and the levels of the signal lights input from the light sources to the arrayed waveguide grating are detected by the level detecting means. By adjusting the output levels of the light sources, the levels of the signal lights of the respective wavelengths which have been multiplexed by the arrayed waveguide grating are set to desired values. The input/output characteristics can thus be made flat or freely adjusted at the output waveguides depending on an apparatus or system with which the demultiplexer is used.

According to a twenty-first aspect of the present invention, an optical communication system comprises: optical transmitting means for transmitting optical signals of respective wavelengths parallel to each other; a multiplexer for wavelength-division multiplexing the optical signals of respective wavelengths transmitted by the light transmitting means; an optical transmission path for transmitting a wavelength-division multiplexed optical signal output from the multiplexer; a node disposed in the optical transmission path and having an arrayed waveguide grating; a demultiplexer for being supplied with the optical signal transmitted over the optical transmission path via the node and demultiplexing the optical signal into the optical signals of respective wavelengths; and optical receiving means for receiving the optical signals of respective wavelengths demultiplexed by the demultiplexer; the multiplexer comprising an arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides; the demultiplexer comprising an arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides.

With the twenty-first aspect of the present invention, the optical communication system, which is of an linear type, comprises optical transmitting means, a multiplexer for wavelength-division multiplexing the optical signals of respective wavelengths transmitted by the light transmitting means, an optical transmission path for transmitting a multiplexed optical signal output from the multiplexer, a node disposed in the optical transmission path and having an arrayed waveguide grating, a demultiplexer for being supplied with the optical signal transmitted over the optical transmission path via the node and demultiplexing the optical signal into the optical signals of respective wavelengths, and optical receiving means for receiving the optical signals of respective wavelengths demultiplexed by the demultiplexer. The multiplexer comprises an arrayed waveguide grating according to the third aspect and sets optical input/output characteristics to predetermined ratios for the respective input waveguides corresponding to the output waveguides, and the demultiplexer comprises an arrayed waveguide grating according to the first aspect and sets optical input/output characteristics to predetermined ratios for the respective output waveguides with respect to the input waveguides.

According to a twenty-second aspect of the present invention, an optical communication system comprises: optical transmitting means for transmitting optical signals of respective wavelengths parallel to each other; a multiplexer for wavelength-division multiplexing the optical signals of respective wavelengths transmitted by the light transmitting means; an optical transmission path for transmitting a wavelength-division multiplexed optical signal output from the multiplexer, a node disposed in the optical transmission path and having an arrayed waveguide grating; a demultiplexer for being supplied with the optical signal transmitted over the optical transmission path via the node and demultiplexing the optical signal into the optical signals of respective wavelengths; and optical receiving means for receiving the optical signals of respective wavelengths demultiplexed by the demultiplexer; the multiplexer comprising an arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides depending on the differences between optical losses along respective paths in the output slab waveguide; the demultiplexer comprising an arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides depending on the differences between optical losses along respective paths in the output slab waveguide.

With the twenty-second aspect of the present invention, the optical communication system, which is of an linear type, comprises optical transmitting means, a multiplexer for wavelength-division multiplexing the optical signals of respective wavelengths transmitted by the light transmitting means, an optical transmission path for transmitting a multiplexed optical signal output from the multiplexer, a node disposed in the optical transmission path and having an arrayed waveguide grating, a demultiplexer for being supplied with the optical signal transmitted over the optical transmission path via the node and demultiplexing the optical signal into the optical signals of respective wavelengths, and optical receiving means for receiving the optical signals of respective wavelengths demultiplexed by the demultiplexer. The multiplexer comprises an arrayed waveguide grating according to the fourth aspect and sets optical input/output characteristics to predetermined ratios for the respective input waveguides corresponding to the output waveguides, and the demultiplexer comprises an arrayed waveguide grating according to the second aspect and sets optical input/output characteristics to predetermined ratios for the respective output waveguides with respect to the input waveguides.

According to a twenty-third aspect of the present invention, an optical communication system comprises: an annular transmission path having a plurality of nodes interconnected in a ring by a transmission path, for transmitting a multiplexed optical signal over the transmission path; each of the nodes having a first arrayed waveguide grating for demultiplexing a multiplexed optical signal into optical signals of respective wavelengths, and a second arrayed waveguide grating for multiplexing the demultiplexed optical signals of respective wavelengths; the first arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides; the second arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides.

With the twenty-third aspect of the present invention, the optical communication system, which is of an annular type, comprises an annular transmission path having a plurality of nodes interconnected in a ring by a transmission path, for transmitting a multiplexed optical signal over the transmission path, each of the nodes having a first arrayed waveguide grating for demultiplexing a multiplexed optical signal into optical signals of respective wavelengths, and a second arrayed waveguide grating for multiplexing the demultiplexed optical signals of respective wavelengths. The first arrayed waveguide grating comprises an arrayed waveguide grating according to the third aspect and sets optical input/output characteristics to predetermined ratios for the respective output waveguides connected to the output end of the slab waveguide with respect to the input waveguides. The second arrayed waveguide grating comprises an arrayed waveguide grating according to the first aspect and sets optical input/output characteristics to predetermined ratios for the respective input waveguides corresponding to the output waveguides.

According to a twenty-fourth aspect of the present invention, an optical communication system comprises: an annular transmission path having a plurality of nodes interconnected in a ring by a transmission path, for transmitting a multiplexed optical signal over the transmission path; each of the nodes having a first arrayed waveguide grating for demultiplexing a multiplexed optical signal into optical signals of respective wavelengths, and a second arrayed waveguide grating for multiplexing the demultiplexed optical signals of respective wavelengths; the first arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides depending on the differences between optical losses along respective paths in the output slab waveguide; the second arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides depending on the differences between optical losses along respective paths in the output slab waveguide.

With the twenty-fourth aspect of the present invention, the optical communication system, which is of an annular type, comprises an annular transmission path having a plurality of nodes interconnected in a ring by a transmission path, for transmitting a wavelength-division multiplexed optical signal over the transmission path, each of the nodes having a first arrayed waveguide grating for demultiplexing a wavelength-division multiplexed optical signal into optical signals of respective wavelengths, and a second arrayed waveguide grating for wavelength-division multiplexing the demultiplexed optical signals of respective wavelengths. The first arrayed waveguide grating comprises an arrayed waveguide grating according to the fourth aspect and sets optical input/output characteristics to predetermined ratios for the respective output waveguides connected to the output end of the slab waveguide with respect to the input waveguides. The second arrayed waveguide grating comprises an arrayed waveguide grating according to the second aspect and sets optical input/output characteristics to predetermined ratios for the respective input waveguides corresponding to the output waveguides.

According to a twenty-fifth aspect of the present invention, an optical communication system comprises: optical transmitting means for transmitting optical signals of respective wavelengths parallel to each other; a multiplexer for multiplexing the optical signals of respective wavelengths transmitted by the light transmitting means; an optical transmission path for transmitting a multiplexed optical signal output from the multiplexer; a node disposed in the optical transmission path; a demultiplexer for being supplied with the optical signal transmitted over the optical transmission path via the node and demultiplexing the optical signal into the optical signals of respective wavelengths; and optical receiving means for receiving the optical signals of respective wavelengths demultiplexed by the demultiplexer; the multiplexer comprising an arrayed waveguide grating having a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides, level detecting means for detecting levels of the signal lights input to the arrayed waveguide grating, and level adjusting means for comparing the levels of the signal lights detected by the level detecting means with predetermined levels for the respective wavelengths, and adjusting output levels of the light signals to set the levels of the waveguides multiplexed by the arrayed waveguide grating to desired values; the demultiplexer comprising an arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides, and level adjusting means for being supplied with the signal lights of respective wavelengths from the output waveguides of the arrayed waveguide grating, and adjusting output levels of the signal lights to desired values.

With the twenty-fifth aspect of the present invention, the optical communication system, which is of a linear type, comprises optical transmitting means, a multiplexer for wavelength-division multiplexing the optical signals of respective wavelengths transmitted by the light transmitting means, an optical transmission path for transmitting a wavelength-division multiplexed optical signal output from the multiplexer, a node disposed in the optical transmission path, a demultiplexer for being supplied with the optical signal transmitted over the optical transmission path via the node and demultiplexing the optical signal into the optical signals of respective wavelengths, and optical receiving means for receiving the optical signals of respective wavelengths demultiplexed by the demultiplexer. The multiplexer comprises a device according to the nineteenth aspect, and the demultiplexer comprises a device according to the seventeenth aspect, thus setting optical input/output characteristics to predetermined ratios.

According to a twenty-sixth aspect of the present invention, an optical communication system comprises: optical transmitting means for transmitting optical signals of respective wavelengths parallel to each other; a multiplexer for multiplexing the optical signals of respective wavelengths transmitted by the light transmitting means; an optical transmission path for transmitting a multiplexed optical signal output from the multiplexer; a node disposed in the optical transmission path, a demultiplexer for being supplied with the optical signal transmitted over the optical transmission path via the node and demultiplexing the optical signal into the optical signals of respective wavelengths; and optical receiving means for receiving the optical signals of respective wavelengths demultiplexed by the demultiplexer; the multiplexer comprising an arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides depending on the differences between optical losses along respective paths in the output slab waveguide, level detecting means for detecting levels of the signal lights input to the arrayed waveguide grating, and level adjusting means for comparing the levels of the signal lights detected by the level detecting means with predetermined levels for the respective wavelengths, and adjusting output levels of the signal lights to set the levels of the waveguides multiplexed by the arrayed waveguide grating to desired values; the demultiplexer comprising an arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides depending on the differences between optical losses along respective paths in the output slab waveguide, and level adjusting means for being supplied with the signal lights of respective wavelengths from the output waveguides of the arrayed waveguide grating, and adjusting output levels of the signal lights to desired values.

With the twenty-sixth aspect of the present invention, the optical communication system, which is of a linear type, comprises optical transmitting means, a multiplexer for wavelength-division multiplexing the optical signals of respective wavelengths transmitted by the light transmitting means, an optical transmission path for transmitting a wavelength-division multiplexed optical signal output from the multiplexer, a node disposed in the optical transmission path, a demultiplexer for being supplied with the optical signal transmitted over the optical transmission path via the node and demultiplexing the optical signal into the optical signals of respective wavelengths, and optical receiving means for receiving the optical signals of respective wavelengths demultiplexed by the demultiplexer. The multiplexer comprises a device according to the twentieth aspect, and the demultiplexer comprises a device according to the eighteenth aspect, thus setting optical input/output characteristics to predetermined ratios.

According to a twenty-seventh aspect of the present invention, an optical communication system comprises: an annular transmission path having a plurality of nodes interconnected in a ring by a transmission path, for transmitting a multiplexed optical signal over the transmission path; each of the nodes having a demultiplexer for demultiplexing a multiplexed optical signal into optical signals of respective wavelengths, and a multiplexer for multiplexing the demultiplexed optical signals of respective wavelengths; the demultiplexer comprising an arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides, and level adjusting means for being supplied with the signal lights of respective wavelengths from the output waveguides of the arrayed waveguide grating, and adjusting output levels of the signal lights to desired values; the multiplexer comprising an arrayed waveguide grating having a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides, level detecting means for detecting levels of the signal lights input to the arrayed waveguide grating, and level adjusting means for comparing the levels of the signal lights detected by the level detecting means with predetermined levels for the respective wavelengths, and adjusting output levels of the light signals to set the levels of the waveguides multiplexed by the arrayed waveguide grating to desired values.

With the twenty-seventh aspect of the present invention, the optical communication system, which is of an annular type, comprises an annular transmission path having a plurality of nodes interconnected in a ring by a transmission path, for transmitting a wavelength-division multiplexed optical signal over the transmission path, each of the nodes having a demultiplexer for demultiplexing a wavelength-division multiplexed optical signal into optical signals of respective wavelengths, and a multiplexer for multiplexing the demultiplexed optical signals of respective wavelengths. The demultiplexer comprises: a device according to the seventeenth aspect, and the demultiplexer comprises a device according to the nineteenth aspect, thus setting optical input/output characteristics to predetermined ratios.

According to a twenty-eighth aspect of the present invention, an optical communication system comprises: an annular transmission path having a plurality of nodes interconnected in a ring by a transmission path, for transmitting a multiplexed optical signal over the transmission path; each of the nodes having a demultiplexer for demultiplexing a multiplexed optical signal into optical signals of respective wavelengths, and a multiplexer for multiplexing the demultiplexed optical signals of respective wavelengths; the demultiplexer comprising an arrayed waveguide grating comprising one or plural input waveguides for inputting signal lights, a plurality of output waveguides for outputting signal lights, a channel waveguide array having waveguides which are successively longer with predetermined waveguide length differences, an input slab waveguide connecting an input end of the channel waveguide array to the input waveguides, and an output slab waveguide connecting an output end of the channel waveguide array to the output waveguides, and having optical input/output characteristics set to predetermined ratios for the respective output waveguides with respect to the input waveguides depending on the differences between optical losses along respective paths in the output slab waveguide, and level adjusting means for being supplied with the signal lights of respective wavelengths from the output waveguides of the arrayed waveguide grating, and adjusting output levels of the signal lights to desired values; the multiplexer comprising an arrayed waveguide grating comprising a plurality of input waveguides for inputting signal lights having different wavelengths each other, one or plural output waveguides for outputting signal lights, a channel waveguide array having waveguides which are successively longer with predetermined waveguide length differences, an output slab waveguide connecting an output end of the channel waveguide array to the output waveguides, and an input slab waveguide connecting an input end of the channel waveguide array to the input waveguides, and having optical input/output characteristics set to predetermined ratios for the respective input waveguides corresponding to the output waveguides depending on the differences between optical losses along respective paths in the output slab waveguide, level detecting means for detecting levels of the signal lights input to the arrayed waveguide grating, and level adjusting means for comparing the levels of the signal lights detected by the level detecting means with predetermined levels for the respective wavelengths, and adjusting output levels of the signal lights to set the levels of the waveguides multiplexed by the arrayed waveguide grating to desired values.

With the twenty-eighth aspect of the present invention, the optical communication system, which is of an annular type, comprises an annular transmission path having a plurality of nodes interconnected in a ring by a transmission path, for transmitting a multiplexed optical signal over the transmission path, each of the nodes having a demultiplexer for demultiplexing a wavelength-division multiplexed optical signal into optical signals of respective wavelengths, and a multiplexer for wavelength-division multiplexing the demultiplexed optical signals of respective wavelengths. The demultiplexer comprises a device according to the eighteenth aspect, and the demultiplexer comprises a device according to the twentieth aspect, thus setting optical input/output characteristics to predetermined ratios.

According to the twenty-first through twenty-eighth aspects of the present invention, input/output characteristics can be changed or output characteristics can be made flat without the need for attenuators, amplifiers, or signal level adjusting means outside of the waveguide device. Therefore, the overall system can be simplified, made highly reliable, and reduced in cost.

According to a twenty-ninth aspect of the present invention, a waveguide device comprises one or plural input waveguides for inputting signal lights, a plurality of output waveguides for outputting signal lights, and a slab waveguide having optical input/output characteristics set to predetermined ratios for the respective output waveguides with respect to the input waveguides.

The twenty-ninth aspect of the present invention is concerned with the demultiplexing of light, and optical input/output characteristics are set to predetermined ratios for the respective output waveguides with respect to the input waveguides. This makes it unnecessary to employ external circuit parts for compensating for loss differences.

With the twenty-ninth and subsequent aspects of the present invention, unlike the twenty-eighth and former aspects of the present invention, the waveguide device does not have a channel waveguide, an input slab waveguide, or an output waveguide as an indispensable component with the twenty-eighth and former aspects of the present invention, the input waveguide is disposed on the input side of the input slab waveguide, and the output waveguide is disposed on the output side of the output slab waveguide. With the twenty-ninth and subsequent aspects of the present invention, a device present on the input side of one slab waveguide is referred to as an input waveguide, and a device present on the output side of the slab waveguide is referred to as an output waveguide. The slab waveguide referred to in the twenty-ninth and subsequent aspects of the present invention may be regarded as an input slab waveguide of an arrayed waveguide grating or an output slab waveguide of an arrayed waveguide grating. In other applications, e.g., in a single- or multi-stage star coupler, one or more waveguide devices can be used in combination. The waveguide device may be used in other applications than the arrayed waveguide device and the star coupler.

If the slab waveguide referred to in the twenty-ninth and subsequent aspects of the present invention corresponds to an input waveguide, then the input waveguide is the same as the input waveguide referred to in the twenty-eighth and former aspects of the present invention, but the output waveguide may correspond to individual waveguides of the channel waveguide array as the output waveguide is the waveguide on the output side. Similarly, if the slab waveguide referred to in the twenty-ninth and subsequent aspects of the present invention corresponds to an output waveguide, then the output waveguide is the same as the output waveguide referred to in the twenty-eighth and former aspects of the present invention, but the input waveguide may correspond to individual waveguides of the channel waveguide array as the input waveguide is the waveguide on the input side.

According to a thirtieth aspect of the present invention, a waveguide device comprises: a plurality of output waveguides for outputting signal lights; one or plural input waveguides for inputting signal lights; and a slab waveguide having optical input/output characteristics set to predetermined ratios for the respective input waveguides with respect to the output waveguides.

Unlike the twenty-ninth aspect of the present invention, the thirtieth aspect of the present invention is concerned with the multiplexing of lights, and optical input/output characteristics are set to predetermined ratios for the respective input waveguides with respect to the output waveguides. This makes it unnecessary to employ external circuit parts for compensating for loss differences.

According to a thirty-first aspect of the present invention, a waveguide device comprises: one or plural input waveguides for inputting signal lights; a plurality of output waveguides for outputting signal lights; and a slab waveguide connecting the input waveguides to the output waveguides, the slab waveguide having a core layer disposed therein for propagating light therethrough from the input waveguides to the output waveguides, the core layer being partly cut off in selected or all paths therein which interconnect the input waveguides and the output waveguides, and a cladding layer disposed in cut regions of the core layer and on opposite sides of the core layer, the cut regions in the paths having cut lengths set to predetermined values in the direction in which the signal lights propagate, depending on optical losses of the signal lights propagated in the paths.

With the thirty-first aspect of the present invention, the core layer of the slab waveguide is partly cut off as required, and the optical losses with respect to the output waveguides at the time of demultiplexing the light signal are adjusted based on the lengths of the cut regions.

According to a thirty-second aspect of the present invention, a waveguide device comprises: a plurality of output waveguides for outputting signal lights; one or plural input waveguides for inputting signal lights; and a slab waveguide connecting the input waveguides to the output waveguides, the slab waveguide having a core layer disposed therein for propagating light therethrough from the input waveguides to the output waveguides, the core layer being partly cut off in selected or all paths therein which interconnect the input waveguides and the output waveguides, and a cladding layer disposed in cut regions of the core layer and on opposite sides of the core layer, the cut regions in the paths having cut lengths set to predetermined values in the direction in which the signal lights propagate, depending on optical losses of the signal lights propagated in the paths.

With the thirty-second aspect of the present invention, the core layer of the slab waveguide is partly cut off as required, and the optical losses of the signal lights to be multiplexed into the output waveguides at the time of demultiplexing the light signal are adjusted based on the lengths of the cut regions.

According to a thirty-third aspect of the present invention, a waveguide device comprises: one or plural input waveguides for inputting signal lights; a slab waveguide having an input end connected to the input waveguides; and an output waveguide having a plurality of waveguides connected to an output end of the slab waveguide, wherein each of selected or all of the waveguides have a core layer disposed therein for propagating light therethrough, the core layer being partly cut off, and a cladding layer disposed in cut regions of the core layer and on opposite sides of the core layer, the cut regions having cut lengths set to predetermined values depending on optical losses of the signal lights propagated in the waveguides.

With thirty-third aspect of the present invention, whereas the core layer of the slab waveguide is partly cut off as required with the thirty-first aspect of the present invention, the core layer of some or all of the output waveguides for propagating the signal lights output from the slab waveguide is partly cut off as required, and the optical losses with respect to the output waveguides are adjusted based on the lengths of the cut regions.

According to a thirty-fourth aspect of the present invention, a waveguide device comprises: an input waveguide having a plurality of waveguides for inputting signal lights, wherein each of selected or all of the waveguides have a core layer disposed therein for propagating light therethrough, the core layer being partly cut off, and a cladding layer disposed in cut regions of the core layer and on opposite sides of the core layer, the cut regions having cut lengths set to predetermined values depending on optical losses of the signal lights propagated in the waveguides; one or plural output waveguides for outputting signal lights; and a slab waveguide interconnecting the input waveguides and the output waveguides.

With the thirty-fourth aspect of the present invention, whereas the core layer of the slab waveguide is partly cut off as required with the thirty-second aspect of the present invention, the core layer of some or all of the input waveguides for transmitting the signal lights into the slab waveguide is partly cut off as required, and the optical losses with respect to the input waveguides are adjusted based on the lengths of the cut regions.

According to a thirty-fifth aspect of the present invention, a waveguide device comprises: one or plural input waveguides for inputting signal lights; a slab waveguide having an input end connected to output ends of the input waveguides; and an output waveguide having a plurality of waveguides connected to an output end of the slab waveguide, wherein selected or all of the waveguides have ends having respective central positions displaced from corresponding focused positions in a direction perpendicular to central axes of the waveguides by predetermined values depending on losses to be given to the signal lights propagated in the waveguides.

Usually, the focused positions located in the vicinity of the boundary of the slab waveguide at its output end are aligned with the central axes of the output waveguides to increase the coupling efficiency. With the thirty-fifth aspect of the present invention, the central positions of the ends of the output waveguides which face the slab waveguide are displaced from the corresponding focused positions in the direction perpendicular to the central axes of the output waveguides by predetermined values depending on losses to be given to the signal lights propagated in the output waveguides, thereby adjusting the losses of the signal lights propagated in the output waveguides.

According to a thirty-sixth aspect of the present invention, a waveguide device comprises: a slab waveguide; an output waveguide connected to an output end of the slab waveguide; and a plurality of input waveguides having respective ends connected to an input end of the slab waveguide, wherein selected or all of the ends have respective central positions displaced from corresponding focused positions in a direction perpendicular to central axes of the input waveguides by predetermined values depending on losses to be given to the signal lights propagated in the output waveguides.

Usually, a plurality of light emission points on a slab waveguide are aligned with the central axes of input waveguides are aligned to increase the coupling efficiency. With the thirty-sixth aspect of the present invention, distances by which the input waveguides are displaced in the direction perpendicular to the central axes thereof from the light emission points which are cophasal from the focused positions are set depending on losses to be given to the signal lights propagated in the output waveguides. The losses of the signal lights propagated in the output waveguides are adjusted based on the distances by which the input waveguides are displaced.

According to a thirty-seventh aspect of the present invention, a waveguide device comprises: one or plural input waveguides for inputting signal lights; a slab waveguide having an input end connected to output ends of the input waveguides; and a plurality of output waveguides having respective ends connected to an output end of the slab waveguide, wherein selected or all of central axes of the output waveguides are inclined at the interconnected points of the output waveguides and the slab waveguides at respective angles depending on losses to be given to the signal lights coupled at the interconnected points.

With the thirty-seventh aspect of the present invention, the angles between the light emission points on the input waveguides and the slab waveguides and the central axes of the output waveguides are set depending on losses to be given to the signal lights, for thereby adjusting the losses of the signal lights coupled with the output waveguides.

According to a thirty-eighth aspect of the present invention, a waveguide device comprises: one or plural output waveguides for outputting signal lights; a slab waveguide having an output end connected to input ends of the output waveguides; and a plurality of input waveguides having respective ends connected to an input end of the slab waveguide, wherein selected or all of central axes of the input waveguides are inclined at the interconnected points of the input waveguides and the slab waveguides at respective angles depending on losses to be given to the signal coupled at the interconnected points.

With the thirty-eighth aspect of the present invention, the angles between the light emission points on the slab waveguides and the output waveguides and the central axes of the input waveguides are set depending on losses to be given to the signal lights, for thereby adjusting the losses of the signal lights in the input waveguides when the signal lights are transmitted from the input waveguides to the slab waveguide.

According to a thirty-ninth aspect of the present invention, a waveguide device comprises: one or plural input waveguides for inputting signal lights; a slab waveguide having an input end connected to output ends of the input waveguides; and a plurality of output waveguides having respective ends connected to an output end of the slab waveguide, wherein selected or all of the ends have waveguide widths set to values depending on losses to be given to the signal lights.

With the thirty-ninth aspect of the present invention, the widths, in the direction perpendicular to the propagation axes, of selected or all of the output waveguides are set to values depending on losses to be given to the signal lights, for thereby adjusting the losses of the signal lights propagated in the output waveguides.

According to a fortieth aspect of the present invention, a waveguide device comprises: one or plural output waveguides for outputting signal lights; a slab waveguide having an output end connected to input ends of the output waveguides; and a plurality of input waveguides having respective ends connected to an input end of the slab waveguide, wherein selected or all of the ends have waveguide widths set to values depending on losses to be given to the signal lights.

With the fortieth aspect of the present invention, the widths, in the direction perpendicular to the propagation axes, of selected or all of the input waveguides at their ends connected to the input slab waveguide are set to values depending on losses to be given to the signal lights, for thereby adjusting the losses of the signal lights propagated in the input waveguides.

According to a forty-first aspect of the present invention, a waveguide device comprises: one or plural input waveguides for inputting signal lights; a slab waveguide having an input end connected to output ends of the input waveguides; and a plurality of output waveguides having respective ends connected to an output end of the slab waveguide, wherein the lengths between the ends of the output waveguides and the input waveguides are displaced in the direction of propagation axes of the output waveguides depending on losses to be given to the signal lights propagated from the input waveguides to the ends of the output waveguides.

Usually, the focused positions located in the vicinity of the boundary of the slab waveguide at its output end are aligned with the ends of the output waveguides to provide a focused state to increase the coupling efficiency to the output waveguides. With the forty-first aspect of the present invention, the lengths between the ends of the output waveguides and the focused positions are displaced, for some or all of the output waveguides, in the direction of propagation axes of the output waveguides depending on losses to be given to the signal lights propagated to the output waveguides, for thereby adjusting the losses of the signal lights propagated in the output waveguides.

According to a forty-second aspect of the present invention, a waveguide device comprises: one or plural output waveguides for outputting signal lights; a slab waveguide having an output end connected to input ends of the output waveguides; and a plurality of input waveguides having respective ends connected to an input end of the slab waveguide, wherein the lengths between the ends of the output waveguides and the input waveguides are displaced in the direction of propagation axes of the output waveguides depending on losses to be given to the signal lights propagated from the output waveguides to the ends of the input waveguides.

Usually, a plurality of light emission points which are cophasal with focused positions located in the vicinity of the boundary of the slab waveguide at its output end are aligned with the ends of the input waveguides to increase the coupling efficiency of signal lights from the input waveguides coupled to the output waveguides. With the forty-second aspect of the present invention, some or all of the input waveguides are displaced from their normal positions in the direction of the propagation axes depending on losses to be given to the signal lights propagated in the input waveguides over the distances from the ends of the input waveguides to the focused positions, for thereby adjusting the losses of the signal lights.

With the twenty-ninth through forty-second aspects of the present invention, since the losses of the signal lights in the respective waveguides in the waveguide device are different from each other, input/output characteristics can be changed or output characteristics can be made flat without the need for attenuators, amplifiers, or signal level adjusting means outside of the waveguide device. Therefore, a module or a device using an arrayed waveguide grating can be simplified, made highly reliable, and reduced in cost.

According to a forty-third aspect of the present invention, a demultiplexer comprises: a waveguide device having one or plural input waveguides for inputting signal lights, a plurality of output waveguides for outputting signal lights, and a slab waveguide having optical input/output characteristics set to predetermined ratios for the respective output waveguides with respect to the input waveguides; and level adjusting means for being supplied with signal lights output from the output waveguides of the waveguide device, and adjusting output levels of the signal lights to desired values.

With the forty-third aspect of the present invention, the waveguide device itself sets the optical input/output characteristics to predetermined ratios for the respective output waveguides with respect to the input waveguides depending on optical loss differences at the boundary of the slab waveguide, and the level adjusting means is supplied with the signal lights of respective wavelengths from the output waveguides and adjusts output levels of the signal lights to desired values. The input/output characteristics can thus be made flat or freely adjusted. Furthermore, since the demultiplexer comprises the waveguide device with the input/output characteristics adjusted and the level adjusting means for adjusting the output levels of the wavelengths output from the output waveguides, errors of the input/output characteristics of the waveguide device itself can be corrected.

According to a forty-fourth aspect of the present invention, a multiplexer comprises: a plurality of light sources for respective signals; a waveguide device having a plurality of input waveguides for inputting signal lights, one or plural output waveguides for outputting signal lights, and a slab waveguide having optical input/output characteristics set to predetermined ratios for the respective input waveguides with respect to the output waveguides; level detecting means for detecting levels of the signal lights input from the light sources to the waveguide device, and level adjusting means for comparing the levels of the signal lights detected by the level detecting means with predetermined levels for the respective signal lights; and adjusting output levels of the respective signal lights to set the levels of the signal lights multiplexed by the waveguide device to desired values.

With the forty-fourth aspect of the present invention, the waveguide device itself sets the optical input/output characteristics to predetermined ratios for the respective input waveguides with respect to the output waveguides depending on optical loss differences at the boundary of the slab waveguide, and the levels of the signal lights input from the light sources to the waveguide device are detected by the level detecting means. By adjusting the output levels of the light sources, the levels of the signal lights of the respective wavelengths which have been multiplexed by the waveguide device are set to desired values. The input/output characteristics can thus be made flat or freely adjusted at the output waveguides. Furthermore, errors of the input/output characteristics of the waveguide device itself can be corrected.

According to a forty-fifth aspect of the present invention, an optical communication system comprises: optical transmitting means for transmitting optical signals of respective wavelengths parallel to each other; a multiplexer for multiplexing the optical signals of respective wavelengths transmitted by the light transmitting means; an optical transmission path for transmitting a multiplexed optical signal output from the multiplexer; a node disposed in the optical transmission path and having a waveguide device; a demultiplexer for being supplied with the optical signal transmitted over the optical transmission path via the node and demultiplexing the optical signal into the optical signals of respective wavelengths; and optical receiving means for receiving the optical signals of respective wavelengths demultiplexed by the demultiplexer; the multiplexer comprising a plurality of input waveguides for inputting signal lights, one or plural output waveguides for outputting signal lights, and a slab waveguide having optical input/output characteristics set to predetermined ratios for the respective input waveguides with respect to the output waveguides; the demultiplexer comprising a waveguide device comprising one or plural input waveguides for inputting signal lights, a plurality of output waveguides for outputting signal lights, and a slab waveguide having optical input/output characteristics set to predetermined ratios for the respective output waveguides with respect to the input waveguides.

With the forty-fifth aspect of the present invention, the optical communication system, which is of a linear type, comprises optical transmitting means, a multiplexer for wavelength-division multiplexing the optical signals of respective wavelengths transmitted by the light transmitting means, an optical transmission path for transmitting a wavelength-division multiplexed optical signal output from the multiplexer, a node disposed in the optical transmission path and having a waveguide device, a demultiplexer for being supplied with the optical signal transmitted over the optical transmission path via the node and demultiplexing the optical signal into the optical signals of respective wavelengths, and optical receiving means for receiving the optical signals of respective wavelengths demultiplexed by the demultiplexer. The multiplexer comprises a waveguide device according to the thirtieth aspect and sets optical input/output characteristics to predetermined ratios for the respective input waveguides with respect to the output waveguides that are connected to the output end of the slab waveguide. The demultiplexer comprises a waveguide device according to the twenty-ninth aspect and sets optical input/output characteristics to predetermined ratios for the respective output waveguides with respect to the input waveguides.

According to a forty-sixth aspect of the present invention, an optical communication system comprises: an annular transmission path having a plurality of nodes interconnected in a ring by a transmission path, for transmitting a multiplexed optical signal over the transmission path; each of the nodes having a first waveguide device for demultiplexing a multiplexed optical signal into optical signals of respective wavelengths; and a second waveguide device for multiplexing the demultiplexed optical signals of respective wavelengths, the first waveguide device comprising one or plural input waveguides for inputting, signal lights, a plurality output waveguides for outputting signal lights, and a slab waveguide having optical input/output characteristics set to predetermined ratios for the respective output waveguides with respect to the input waveguides, the second waveguide device comprising a plurality of input waveguides for inputting signal lights, one or plural output waveguides for outputting signal lights, and a slab waveguide having optical input/output characteristics set to predetermined ratios for the respective input waveguides with respect to the output waveguides.

With the forty-sixth aspect of the present invention, the optical communication system, which is of an annular type, comprises an annular transmission path having a plurality of nodes interconnected in a ring by a transmission path, for transmitting a multiplexed optical signal over the transmission path, each of the nodes having a first waveguide device for demultiplexing a multiplexed optical signal into optical signals of respective wavelengths, and a second waveguide device for wavelength-division multiplexing the demultiplexed optical signals of respective wavelengths. The first waveguide device comprises a waveguide device according to the thirtieth aspect and sets optical input/output characteristics to predetermined ratios for the respective input waveguides with respect to the output waveguides that are connected to the output end of the slab waveguide. The second waveguide device comprises a waveguide device according to the twenty-ninth aspect and sets optical input/output characteristics to predetermined ratios for the respective output waveguides with respect to the input waveguides.

According to a forty-seventh aspect of the present invention, an optical communication system comprises: optical transmitting means for transmitting optical signals of respective wavelengths parallel to each other; a multiplexer for multiplexing the optical signals of respective wavelengths transmitted by the light transmitting means; an optical transmission path for transmitting a multiplexed optical signal output from the multiplexer; a node disposed in the optical transmission path; a demultiplexer for being supplied with the optical signal transmitted over the optical transmission path via the node and demultiplexing the optical signal into the optical signals of respective wavelengths; and optical receiving means for receiving the optical signals of respective wavelengths demultiplexed by the demultiplexer; the multiplexer comprising a plurality of light sources for respective signals, a waveguide device having a plurality of input waveguides for inputting signal lights, one or plural output waveguides for outputting signal lights, and a slab waveguide having optical input/output characteristics set to predetermined ratios for the respective input waveguides with respect to the output waveguides, level detecting means for detecting levels of the signal lights input from the light sources to the waveguide device, and level adjusting means for comparing the levels of the signal lights detected by the level detecting means with predetermined levels for the respective signal lights, and adjusting output levels of the respective signal lights to set the levels of the signal lights multiplexed by the waveguide device to desired values; the demultiplexer comprising a waveguide device having one or plural input waveguides for inputting signal lights, a plurality of output waveguides for outputting signal lights, and a slab waveguide having optical input/output characteristics set to predetermined ratios for the respective output waveguides with respect to the input waveguides, and level adjusting means for being supplied with the signal lights from the output waveguides of the waveguide device, and adjusting output levels of the signal lights to desired values.

With the forty-seventh aspect of the present invention, the optical communication system, which is of a linear type, comprises: optical transmitting means, a multiplexer for wavelength-division multiplexing the optical signals of respective wavelengths transmitted by the light transmitting means; an optical transmission path for transmitting a wavelength-deivision multiplexed optical signal output from the multiplexer; a node disposed in the optical transmission path, a demultiplexer for being supplied with the optical signal transmitted over the optical transmission path via the node and demultiplexing the optical signal into the optical signals of respective wavelengths; and optical receiving means for receiving the optical signals of respective wavelengths demultiplexed by the demultiplexer. The multiplexer comprises a device according to the forty-fourth aspect, and the demultiplexer comprises a device according to the forty-third aspect, setting optical input/output characteristics to predetermined ratios.

According to a forty-eighth aspect of the present invention, an optical communication system comprises: an annular transmission path having a plurality of nodes interconnected in a ring by a transmission path, for transmitting a multiplexed optical signal over the transmission path; each of the nodes having a demultiplexer for demultiplexing a multiplexed optical signal into optical signals of respective wavelengths, and a multiplexer for multiplexing the demultiplexed optical signals of respective wavelengths; the demultiplexer comprising a waveguide device having one or-plural input waveguides for inputting signal lights, a plurality of output waveguides for outputting signal lights, and a slab waveguide having optical input/output characteristics set to predetermined ratios for the respective output waveguides with respect to the input waveguides, and level adjusting means for being supplied with the signal lights from the output waveguides of the waveguide device, and adjusting output levels of the signal lights to desired values; and the multiplexer comprising a plurality of light sources for respective signals, a waveguide device having a plurality of input waveguides for inputting signal lights, one or plural output waveguides for outputting signal lights, and a slab waveguide having optical input/output characteristics set to predetermined ratios for the respective input waveguides with respect to the output waveguides, level detecting means for detecting levels of the signal lights input from the light sources to the waveguide device, and level adjusting means for comparing the levels of the signal lights detected by the level detecting means with predetermined levels for the respective signal lights, and adjusting output levels of the respective signal lights to set the levels of the signal lights multiplexed by the waveguide device to desired values.

With the forty-eighth aspect of the present invention, the optical communication system, which is of an annular type, comprises an annular transmission path having a plurality of nodes interconnected in a ring by a transmission path, for transmitting a wavelength-devision multiplexed optical signal over the transmission path, each of the nodes having a demultiplexer for demultiplexing a multiplexed optical signal into optical signals of respective wavelengths, and a multiplexer for multiplexing the demultiplexed optical signals of respective wavelengths. The demultiplexer comprises a device according to the forty-third aspect, and the multiplexer comprises a device according to the forty-fourth aspect, setting optical input/output characteristics to predetermined ratios.

According to the forty-fifth through forty-eighth aspects of the present invention, input/output characteristics can be changed or output characteristics can be made flat without the need for attenuators, amplifiers, or signal level adjusting means outside of the waveguide device. Therefore, the overall system can be simplified, made highly reliable, and reduced in cost.

The above and other objects, features, and advantages of the present invention will become apparent from the following description with reference to the accompanying drawings which illustrate examples of the present invention.

BRIEF DESCRIPTION OF THE DRAWINGS

FIG. 7 is an enlarged fragmentary plan view of a peripheral region of the output end of a slab waveguide of an arrayed waveguide grating according to a second embodiment of the present invention;

FIG. 8 is a view illustrative of how light is propagated in a compensation output waveguide, which does not perform output compensation, positioned in a relatively peripheral region of the slab waveguide according to the second embodiment;

FIG. 9 is a view illustrative of how light is propagated in a compensation output waveguide, which performs slight output compensation as compared with the compensation output waveguide shown in FIG. 8, of the slab waveguide according to the second embodiment;

DESCRIPTION OF THE PREFERRED EMBODIMENTS

1st Embodiment

Figure 1:
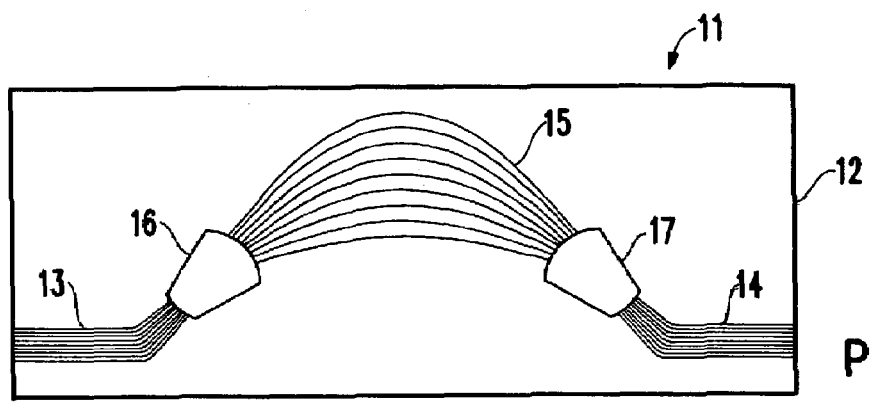
FIG. 1 is a plan view of an overall arrangement of a conventional arrayed waveguide grating.
Figure 2:
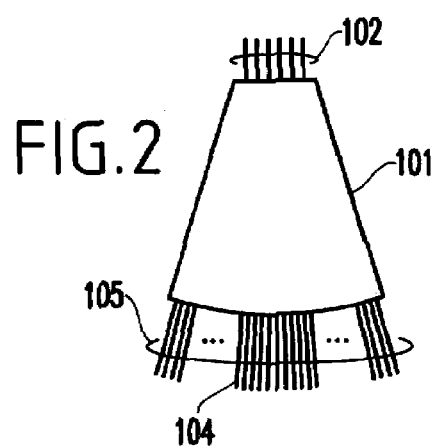
FIG. 2 is a plan view of an overall arrangement of a slab waveguide of an arrayed waveguide grating according to a first embodiment of the present invention.

FIG. 2 shows in plan an output slab waveguide of an arrayed waveguide grating according to a first embodiment of the present invention. The arrayed waveguide grating according to the first embodiment has a structure which is basically the same as the conventional arrayed waveguide grating shown in FIG. 1. As shown in FIG. 2, the output slab waveguide, denoted by 101, has an input end connected to channel waveguide array 102 which sends light into output slab waveguide 101. Output waveguides 105 have waveguides 104, which correspond to output waveguides 14 shown in FIG. 1, having respectively ends connected to the output end of output slab waveguide 101 at a position opposite to the position where channel waveguide array 102 is connected to output slab waveguide 101. Light that has entered from channel waveguide array 102 into output slab waveguide 101 is propagated through output waveguide 105.

Figure 3:
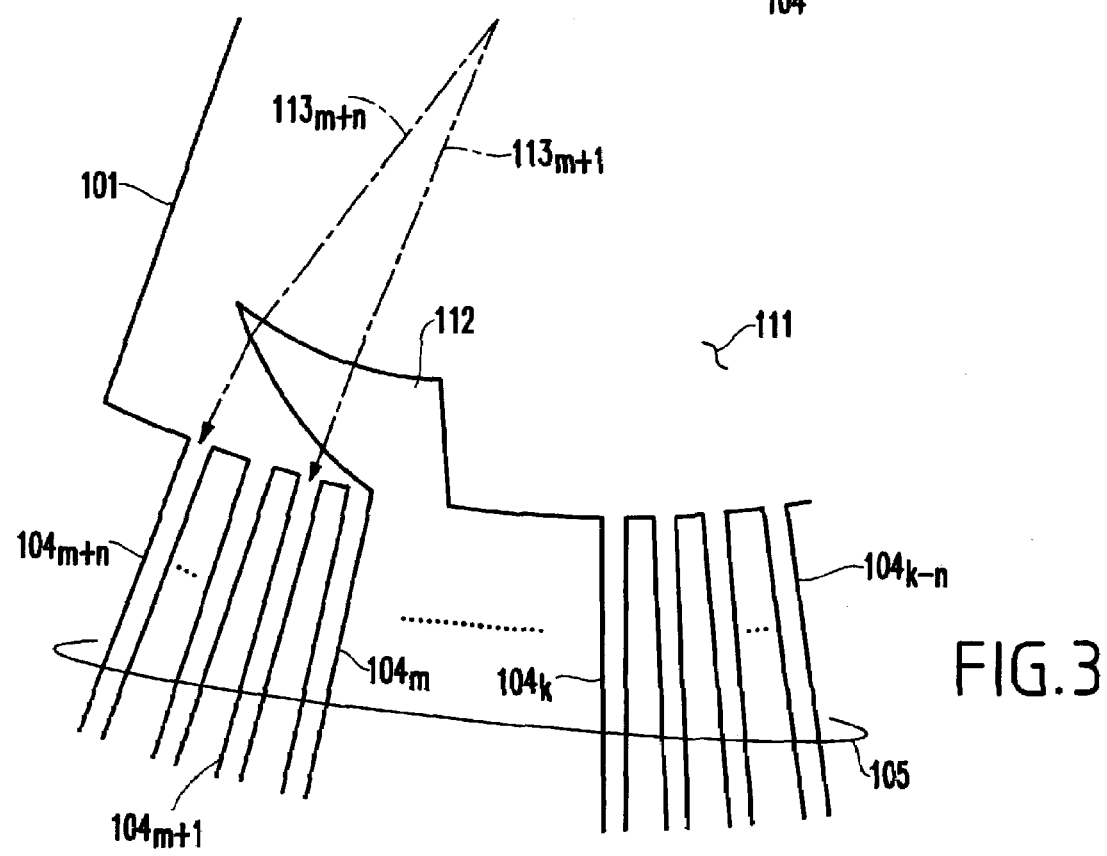
FIG. 3 is an enlarged fragmentary plan view of a portion of the output end of the slab waveguide according to the first embodiment.

FIG. 3 shows in enlarged fragmentary plan a portion of the output end of output slab waveguide 101. Waveguides 104 of output waveguides 105 are divided into compensation waveguides $104_m$ through $104_{m+n}$ with the intensity of incoming light being compensated for and non-compensation waveguides $104_k$ through $104_{k+n}$ with the intensity of incoming light being not compensated for. Compensation waveguides $104_m$ through $104_{m+n}$ are designed to have optical signal levels compensated for, and can be used as monitoring waveguides. Non-compensation waveguides $104_k$ through $104_{k+m}$ are generally used in applications where a reduction in optical signal levels due to compensation is not desirable. All waveguides 104 of output waveguides 105 may be compensation waveguides.

Figure 4:
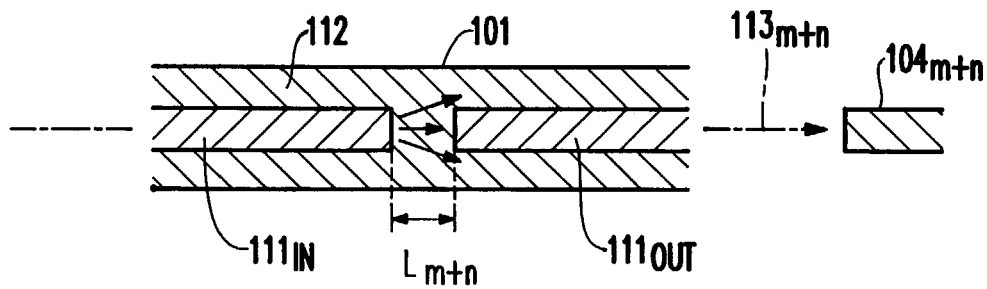
FIG. 4 is a cross-sectional view of the slab waveguide taken along an optical path leading to a compensation output waveguide positioned in a relatively peripheral region of the slab waveguide according to the first embodiment.

Channel waveguide array 102 has core layer 111 for transmitting light entered from channel waveguide array 102. Core layer 111 is disposed in output slab waveguide 101 and extends to the position where output waveguides 105 are connected to output slab waveguide 101. As shown in FIG. 4, channel waveguide array 102 also has cladding layer 112 vertically (in the direction normal to the sheets of FIGS. 2 and 3) sandwiching core layer 111 for thereby confining light in core layer 111. According to the first embodiment, the portion of core layer 111 which corresponds to waveguides $104_m$ through $104_{m+n}$ is cut off in optical paths 113, providing a recess which is filled with cladding layer 112.

Figure 5:
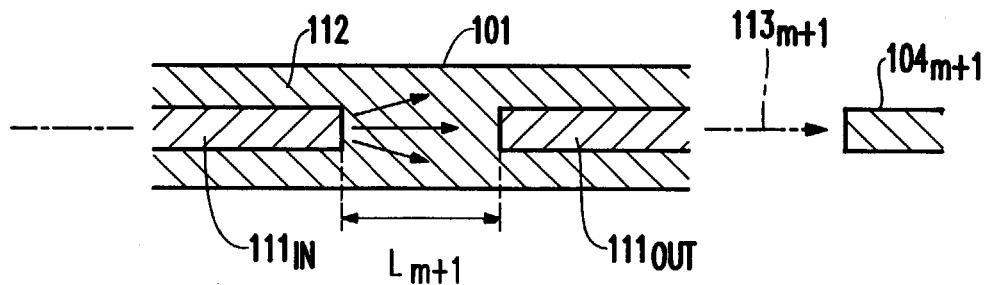
FIG. 5 is a cross-sectional view of the slab waveguide taken along an optical path leading to a compensation output waveguide positioned in a relatively central region of the slab waveguide according to the first embodiment.

FIGS. 4 and 5 show core layer 111 in cross section taken along two respective optical paths illustrated in FIG. 3. Specifically, the cross-sectional views in FIGS. 4 and 5 of output slab waveguide 101 are taken respectively along optical path $113_{m+n}$ and optical path $113_{m+1}$ in the direction normal to the sheets of FIGS. 4 and 5. If core layer 111 were not cut off, the intensity of light emitted from channel waveguide array 102 shown in FIG. 2 and propagating along optical path $113_{m+n}$ leading to compensation waveguide $104_{m+n}$ shown in FIG. 4 would be greater than the intensity of light emitted from channel waveguide array 102 shown in FIG. 2 and propagating along optical path $113_{m+1}$ leading to compensation waveguide $104_{m+1}$ shown in FIG. 5. These different intensities of light are equalized by adjusting the lengths $L_{m+n}$, $L_{m+1}$ by which core layer 111 is cut off respectively along optical paths $113_{m+n}$, $113_{m+1}$.

Specifically, the cut length $L_{m+n}$ along optical path $113_{m+n}$ shown in FIG. 4 is relatively short, and a substantial portion of light emitted from a cut end of input core layer $111_{IN}$ couple to output core layer $111_{OUT}$ and reaches compensation waveguide $104_{m+n}$. However, the cut length $L_{m+1}$ along optical path $113_{m+1}$ shown in FIG. 5 is relatively large, and a substantial portion of light emitted from the cut end of input core layer $111_{IN}$ does not couple to output core layer $111_{OUT}$. Therefore, the intensity of light that reaches compensation waveguide $104_{m+1}$ is greatly reduced.

The intensities of light in respective compensation waveguides $104_m$ through $104_{m+n}$ which are achieved if the core layer 111 is not cut off are measured or theoretically determined, and the optical paths 113 are partly cut off by lengths that are experimentally or theoretically determined in order to equalize the different intensities of light in respective compensation waveguides $104_m$ through $104_{m+n}$. Core layer 111 may be cut off in desired regions by wet etching or dry etching. And the emission light from input core layer $111_{IN}$ may be coupled with compensation waveguide $104_m$ through $104_{m+n}$ directly to avoid in optical characteristics except optical loss characteristic change.

Figure 6:
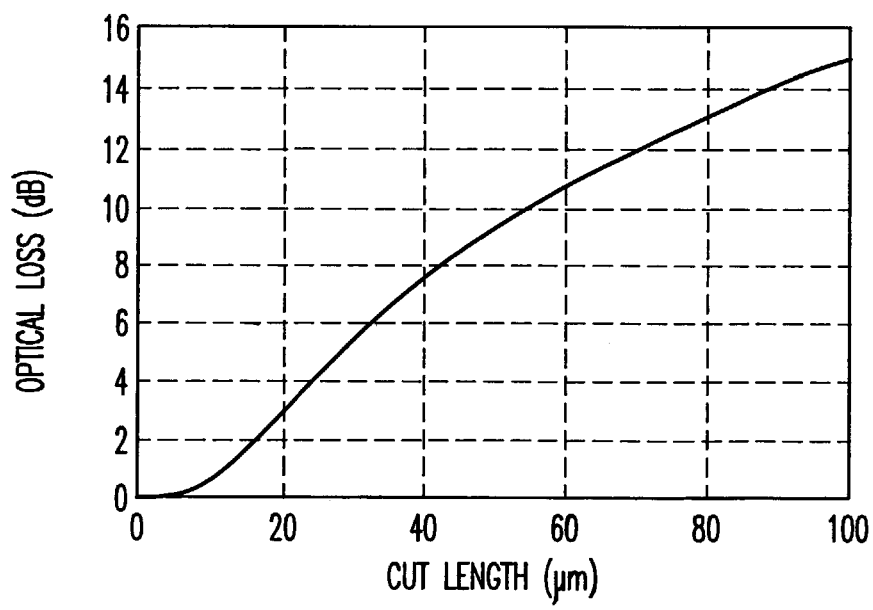
FIG. 6 is a diagram showing the relationship between the cut length of a core layer and an increase in an optical loss caused by the cutting of the core layer in the slab waveguide according to the first embodiment.

FIG. 6 shows the relationship between the cut length of a core layer and an increase in an optical loss caused by the cutting of the core layer in the slab waveguide according to the first embodiment. It can be seen from FIG. 6 that as the region cut in core layer 111 is longer, the loss of light reaching waveguides 104 is greater, attenuating light reaching waveguides 104. Some arrayed waveguide gratings, or multiplexers or demultiplexers or optical communication systems which use arrayed waveguide gratings may not be required to have flat signal characteristics. For example, if amplifiers, not shown, connected to the output ends of compensation waveguides $104_m$ through $104_{m+n}$ do not have flat output characteristics, then it is necessary to design total output characteristics in view of the output characteristics of the amplifiers. Actually, therefore, the intensities of optical signals obtained by compensation waveguides $104_m$ through $104_{m+n}$ are compensated for according to the output characteristics that are needed.

2nd Embodiment

FIG. 7 shows in enlarged fragmentary plan a peripheral region of the output end of a slab waveguide of an arrayed waveguide grating according to a second embodiment of the present invention. The arrayed waveguide grating according to the second embodiment has a structure which is basically the same as the conventional arrayed waveguide grating shown in FIG. 1. As shown in FIG. 7, output slab waveguide 131 has an input end connected to channel waveguide array 102 which sends light into output slab waveguide 131. Optical signals that has propagated through output slab waveguide 131 are brought into phase with each other and focused at respective output port focusing positions $P_{m+n}$, $P_{m+n-1}$, $P_{m+n-2}$, .... The optical signals that have been focused at respective output port focusing positions $P_{m+n}$, $P_{m+n-1}$, $P_{m+n-2}$, ... are then propagated through respective compensation waveguides $132_{m+n}$, $132_{m+n-1}$, $132_{m+n-2}$, ... serving as channel waveguides which correspond to output waveguides 104 shown in FIG. 1.

The arrayed waveguide grating shown in FIG. 7 differs from the arrayed waveguide grating shown in FIG. 1 in that the core layer, not shown, of output slab waveguide 131 is not cut off in optical paths, and the extensions of the central axes of some or all of compensation waveguides $132_{m+n}$, $132_{m+n-1}$, $132_{m+n-2}$, ... are not aligned, i.e., are out of axial alignment, with corresponding output waveguide focusing positions $P_{m+n}$, $P_{m+n-1}$, $P_{m+n-2}$, .... In the present embodiment, the axial misalignments are shown exaggerated for ease of understanding.

FIGS. 8 and 9 are illustrative of how light is propagated in a compensation output waveguide, which does not perform output compensation, positioned in a relatively peripheral region of the slab waveguide according to the second embodiment and in a compensation output waveguide, which performs slight output compensation, of the slab waveguide according to the second embodiment. Compensation waveguides $132_{m+n}$ shown in FIG. 8 does not perform output compensation for attenuating the light. In FIG. 8, the extension of central axis $141_{m+n}$ of compensation waveguide $132_{m+n}$ is in alignment, i.e., is not axially misaligned, with output waveguide focusing position $P_{m+n}$ in exactly the same manner as with the positional relationship between each input port of the ordinary output slab waveguide and the channel waveguide array. In the arrangement shown in FIG. 8, the light having a Gaussian intensity distribution which has been focused at output waveguide focusing position $P_{m+n}$ well matches compensation waveguide $132_{m+n}$ and is propagated therethrough to its output end as indicated by arrow 142.

Compensation waveguide $132_{m+n-1}$ shown in FIG. 9, which is positioned adjacent to compensation waveguide $132_{m+n}$, has its central axis $141_{m+n-1}$, displaced from corresponding output waveguide focusing position $P_{m+n-1}$ by slight distance $d_{m+n-1}$. Because of the axial misalignment, the light having a Gaussian intensity distribution which has been focused at output waveguide focusing position $P_{m+n-1}$ mismatches compensation waveguide $132_{m+n-1}$ when it is propagated therethrough, causing a light intensity loss (attenuation). As a result, even if the intensity of light focused at output waveguide focusing position $P_{m+n-1}$ is greater than the intensity of light focused at output waveguide focusing position $P_{m+n}$, the axial misalignment may be set to a suitable value to equalize the intensity of light propagated through compensation waveguide $132_{m+n-1}$ to the intensity of light propagated through compensation waveguide $132_{m+n}$. In this fashion, the intensities of light that are propagated through all compensation waveguides $132_{m+n}$, $132_{m+n-1}$, $132_{m+n-2}$, ... can be equalized, thus providing flat output characteristics.

Figure 10:
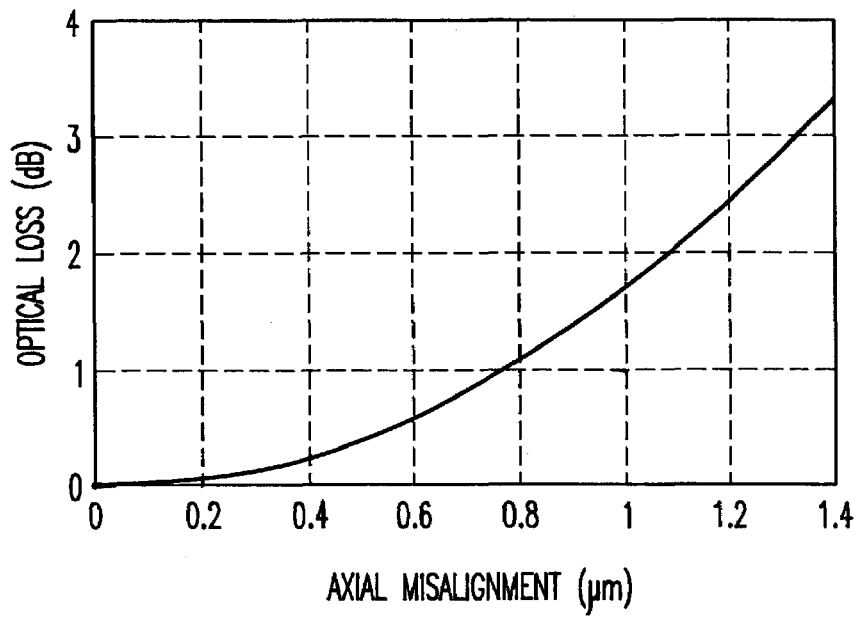
FIG. 10 is a diagram showing the relationship between the axial misalignment of each output port and a loss caused thereby in the slab waveguide according to the second embodiment.

FIG. 10 shows the relationship between the axial misalignment of each output port and a loss caused thereby in the slab waveguide according to the second embodiment in order to obtain such flat output characteristics. As with the first embodiment, the second embodiment does not need to be limited to obtaining flat characteristics at the output end. Specifically, some arrayed waveguide gratings, or multiplexers or demultiplexers or optical communication systems which use arrayed waveguide gratings may not be required to have flat signal characteristics. For example, if amplifiers, not shown, connected to the final output ends, not shown, (output ends of output waveguides 14 shown in FIG. 1) from compensation waveguides $132_{m+n}$, $132_{m+n-1}$, $132_{m+n-2}$, ... do not have flat output characteristics, then it is necessary to design total output characteristics in view of the output characteristics of the amplifiers. Actually, therefore, the intensities of optical signals obtained by compensation waveguides $132_{m+n}$, $132_{m+n-1}$, $132_{m+n-2}$, ... are compensated for according to the output characteristics that are needed.

3rd Embodiment

Figure 11:
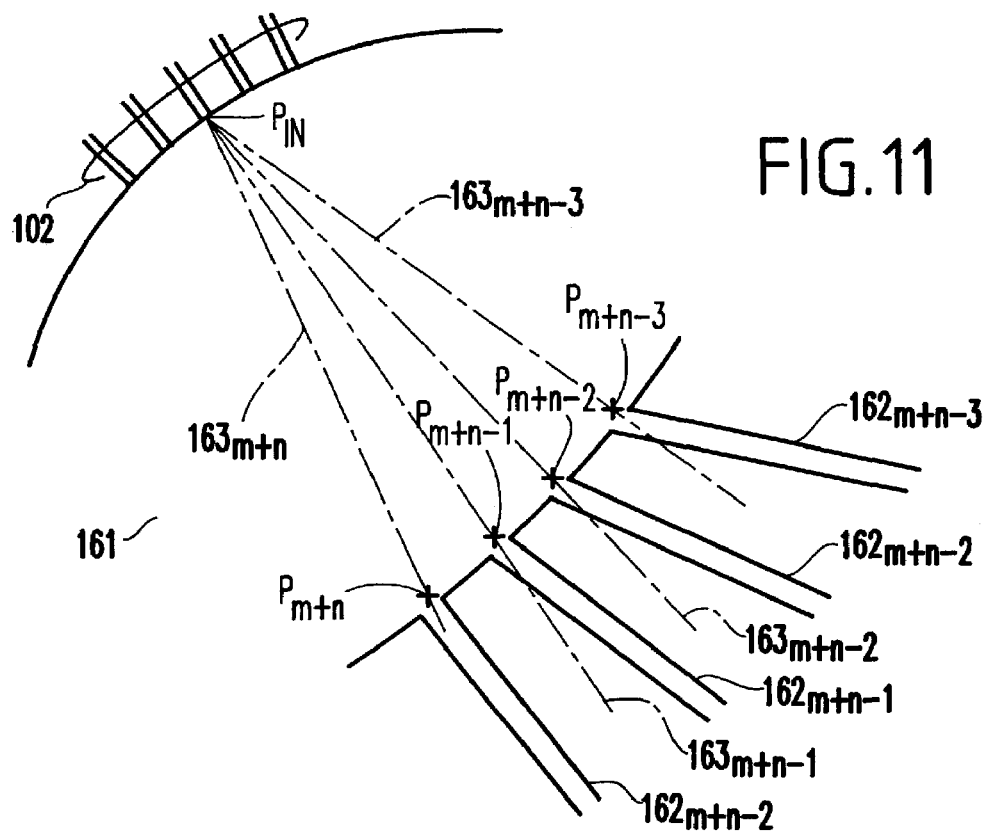
FIG. 11 is an enlarged fragmentary plan view of a portion of a slab waveguide of an arrayed waveguide grating according to a third embodiment of the present invention.

FIG. 11 shows in enlarged fragmentary plan a portion of a slab waveguide of an arrayed waveguide grating according to a third embodiment of the present invention. The arrayed waveguide grating according to the third embodiment has a structure which is basically the same as the conventional arrayed waveguide grating shown in FIG. 1. As shown in FIG. 11, output slab waveguide 161 is arranged to cause optical signals that has entered from channel waveguide array 102 to be brought into phase with each other and focused at respective output waveguide focusing positions $P_{m+n}$, $P_{m+n-1}$, $P_{m+n-2}$, .... The arrayed waveguide grating has compensation waveguides $162_{m+n}$, $162_{m+n-1}$, $162_{m+n-2}$, ... serving as output waveguides, not shown, are disposed in association with respective output waveguide focusing positions $P_{m+n}$, $P_{m+n-1}$, $P_{m+n-2}$, .... Unlike the second embodiment, the extensions of the central axes of compensation waveguides $162_{m+n}$, $162_{m+n-1}$, $162_{m+n-2}$, ... are not misaligned with respective output waveguide focusing positions $P_{m+n}$, $P_{m+n-1}$, $P_{m+n-2}$, .... Instead, with the arrayed waveguide grating according to the third embodiment, the angles between optical paths $163_{m+n}$, $163_{m+n-1}$, $163_{m+n-2}$, ... extending from the light emission points of channel waveguide array 102 to respective output waveguide focusing positions $P_{m+n}$, $P_{m+n-1}$, $P_{m+n-2}$, ... and corresponding compensation waveguides $162_{m+n}$, $162_{m+n-1}$, $162_{m+n-2}$, ... are different depending on the amount by which the light is compensated for.

Figure 12:
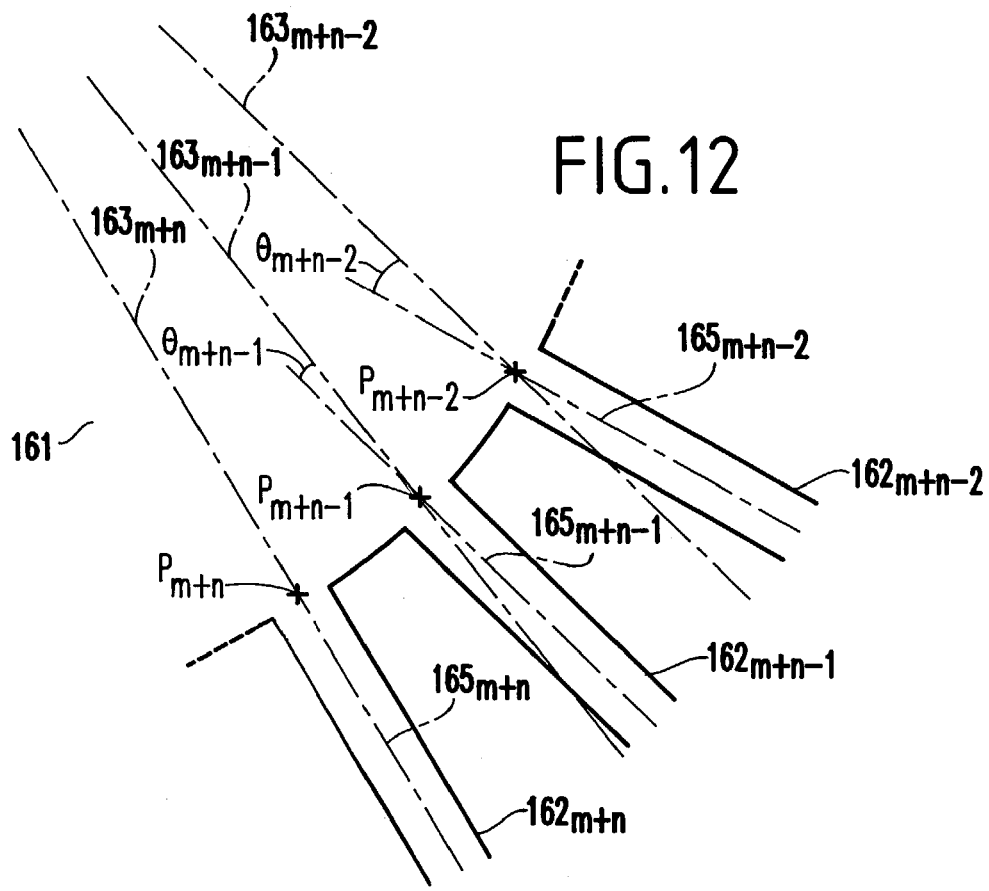
FIG. 12 is an enlarged fragmentary plan view showing the relationship between optical paths leading to respective output ports and the central axes of compensation output waveguides in slab waveguide according to the third embodiment.

FIG. 12 shows in enlarged fragmentary plan the relationship between optical paths leading to respective output ports and the central axes of compensation output waveguides in slab waveguide according to the third embodiment. As with the first and second embodiments, compensation waveguide $162_{m+n}$ which is positioned in a relatively peripheral region of the output end of output slab waveguide 161 is designed to cause no light intensity loss, and the light intensity loss is increased successively from compensation waveguides $162_{m+n}$, $162_{m+n-2}$, ... toward the central region. Optical path $163_{m+n}$ connecting the channel waveguide array to output waveguide focusing position $P_{m+n}$ and central axis $165_{m+n}$ of compensation waveguide $162_{m+n}$ form an angle $\theta_{m+n}$ of 0° therebetween. Thus, optical path $163_{m+n}$ and central axis $165_{m+n}$ are aligned with each other, so that the light having a Gaussian intensity distribution which has been focused at output waveguide focusing position $P_{m+n}$ well matches compensation waveguide $162_{m+n}$ and is propagated therethrough to its output end with the best total coupling efficiency.

Compensation waveguide $162_{m+n-1}$ which is positioned adjacent to compensation waveguide $162_{m+n}$ has its central axis $165_{m+n-1}$ extending out of alignment with corresponding optical path $163_{m+n-1}$, but crossing corresponding optical path $163_{m+n-1}$ at a relatively small angle $\theta_{m+n-1}$. Therefore, the light which has been focused at output waveguide focusing position $P_{m+n-1}$ adjacent to output waveguide focusing position $P_{m+n}$ mismatches compensation waveguide $162_{m+n-1}$ when it is propagated therethrough, causing a slight reduction in the total efficiency. As a result, even if the intensity of light focused at output waveguide focusing position $P_{m+n-1}$ is greater than the intensity of light focused at output waveguide focusing position $P_{m+n}$, the angle $\theta_{m+n-1}$ may be set to a suitable value to equalize the intensity of light propagated through the output waveguide, i.e., compensation waveguide $162_{m+n-1}$ to the intensity of light propagated through compensation waveguide $162_{m+n}$.

The angle $\theta_{m+n-2}$ between central axis $165_{m+n-2}$ of compensation waveguide $162_{m+n-2}$ which is positioned adjacent to compensation waveguide $162_{m+n-1}$ toward the center and corresponding optical path $163_{m+n-2}$ is greater than the angle $\theta_{m+n-1}$ by a certain value. Thus, the coupling efficiency between output waveguide focusing position $P_{m+n-2}$ and compensation waveguide $162_{m+n-2}$ is further reduced from the coupling efficiency between output waveguide focusing position $P_{m+n-1}$ and compensation waveguide $162_{m+n-1}$. The intensity of light propagated through compensation waveguide $162_{m+n-2}$ can be equalized to the intensity of light propagated through compensation waveguide $162_{m+n-1}$ by setting the angle $\theta_{m+n-2}$ to a suitable value. In this manner, the intensities of light that are propagated through all compensation waveguides $162_{m+n}$, $162_{m+n-1}$, $162_{m+n-2}$, ... can be equalized, thus providing flat output characteristics.

Figure 13:
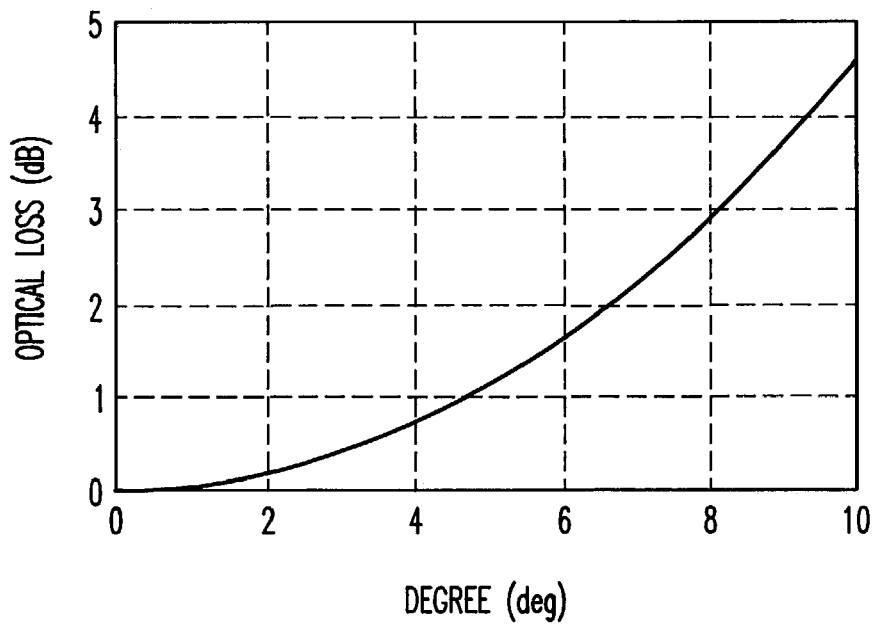
FIG. 13 is a diagram showing the relationship between the angle of the central axis and a loss caused thereby in the slab waveguide according to the third embodiment.

FIG. 13 shows the relationship between the angle of the central axis and a loss caused thereby in the slab waveguide according to the third embodiment. As with the first and second embodiments, the third embodiment does not need to be limited to obtaining flat characteristics at the output end. Specifically, some arrayed waveguide gratings, or multiplexers or demultiplexers or optical communication systems which use arrayed waveguide gratings may not be required to have flat signal characteristics. For example, if amplifiers, not shown, connected to the final output ends, not shown, (output ends of output waveguides 14 shown in FIG. 1) from compensation waveguides $162_{m+n}$, $162_{m+n-1}$, $162_{m+n-2}$, ... do not have flat output characteristics, then it is necessary to design total output characteristics in view of the output characteristics of the amplifiers. Actually, therefore, the intensities of optical signals obtained by compensation waveguides $162_{m+n}$, $162_{m+n-1}$, $162_{m+n-2}$, ... are compensated for according to the output characteristics that are needed.

4th Embodiment

Figure 14:
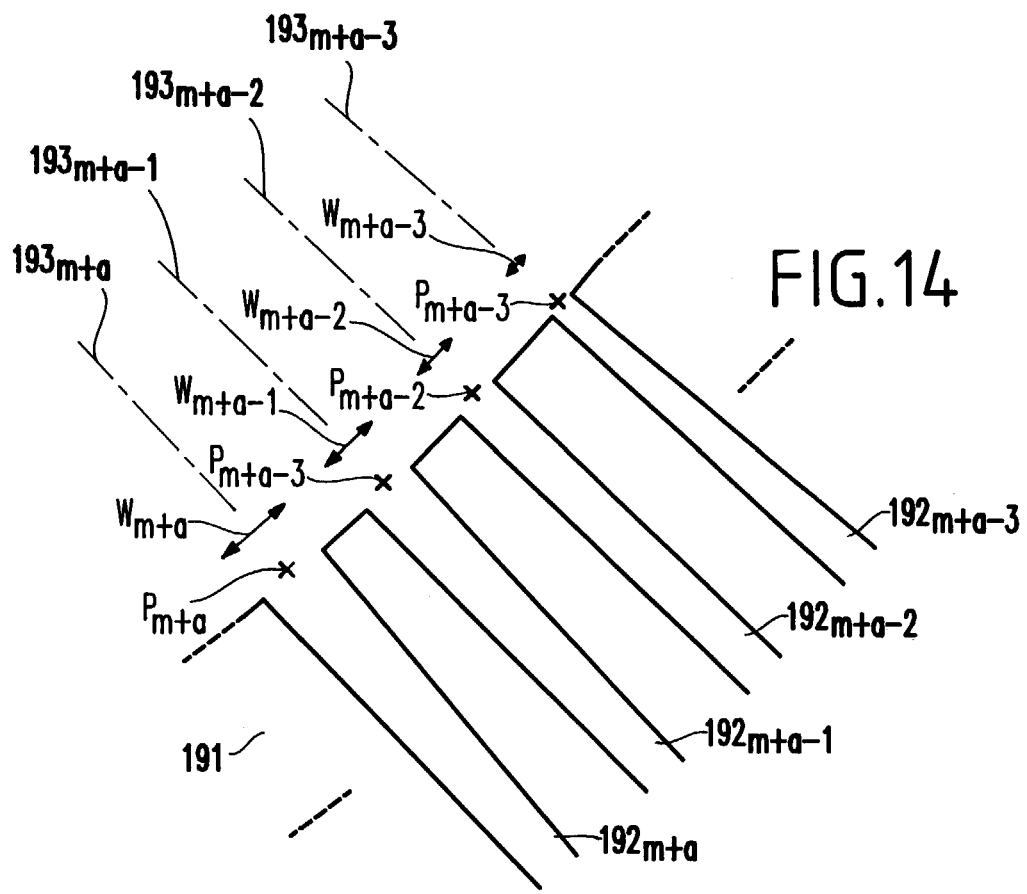
FIG. 14 is an enlarged fragmentary plan view of a peripheral region of the output end of a slab waveguide of an arrayed waveguide grating according to a fourth embodiment of the present invention.

FIG. 14 shows in enlarged fragmentary plan a peripheral region of the output end of a slab waveguide of an arrayed waveguide grating according to a fourth embodiment of the present invention. The arrayed waveguide 5 grating according to the fourth embodiment has a structure which is basically the same as the conventional arrayed waveguide grating shown in FIG. 1. As shown in FIG. 14, as with output slab waveguide 101 shown in FIG. 1, output slab waveguide 191 is arranged to cause optical signals that has entered from a channel waveguide array, not shown, to be brought into phase with each other and focused at respective output waveguide focusing positions $P_{m+a}$, $P_{m+a-1}$, $P_{m+a-2}$, .... The optical signals that have been focused at respective output waveguide focusing positions $P_{m+a}$, $P_{m+a-1}$, $P_{m+a-2}$, ... are propagated through respective compensation waveguides $192_{m+a}$, $192_{m+a-1}$, $192_{m+a-2}$, ....

As with the third embodiment, output waveguide focusing positions $P_{m+a}$, $P_{m+a-1}$, $P_{m+a-2}$, ... are positioned respectively on the extensions of the central axes of corresponding compensation waveguides $192_{m+a}$, $192_{m+a-1}$, $192_{m+a-2}$, .... Optical paths $193_{m+a}$, $193_{m+a-1}$, $193_{m+a-2}$, ... extending from light emission points, not shown, on the channel waveguide array to respective output waveguide focusing positions $P_{m+a}$, $P_{m+a-1}$, $P_{m+a-2}$, ... are aligned with the central axis of corresponding compensation waveguides $192_{m+a}$, $192_{m+a-1}$, $192_{m+a-2}$, .... With the arrayed waveguide grating according to the fourth embodiment, waveguide widths $W_{m+a}$, $W_{m+a-1}$, $W_{m+a-2}$, ... of respective compensation waveguides $192_{m+a}$, $192_{m+a-1}$, $192_{m+a-2}$, ... at their ends connected to output slab waveguide 191 are different depending on the amount by which the light is compensated for.

Specifically, the amount by which the light is compensated for is adjusted based on the spot sizes of focused spots at respective output waveguide focusing positions $P_{m+a}$, $P_{m+a-1}$, $P_{m+a-2}$, ... and waveguide widths $W_{m+a}$, $W_{m+a-1}$, $W_{m+a-2}$, ... of corresponding compensation waveguides $192_{m+a}$, $192_{m+a-1}$, $192_{m+a-2}$, ....

Figure 15:
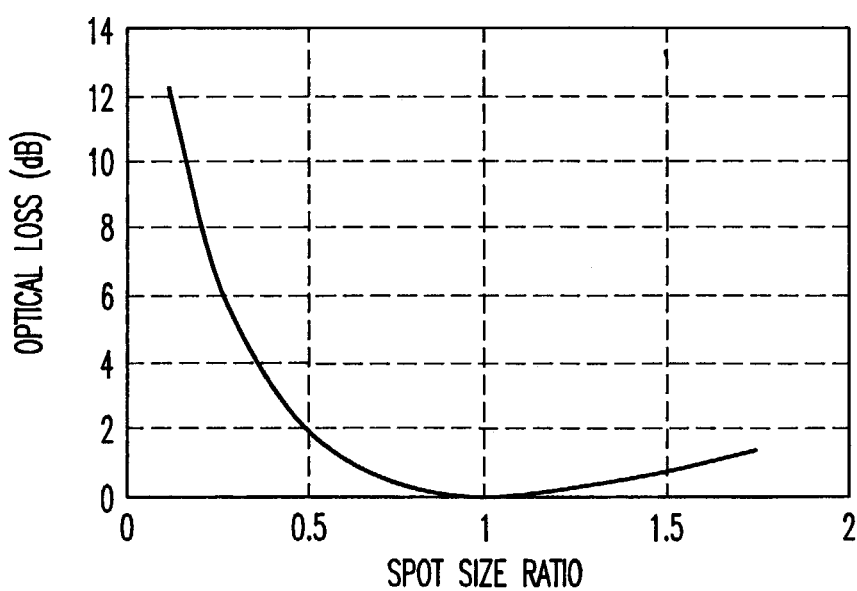
FIG. 15 is a diagram showing the relationship between the ratio between the spot size of a focused spot and the spot size in a waveguide mode of the waveguide, and a loss caused thereby in the slab waveguide according to the fourth embodiment.

FIG. 15 shows the relationship between the ratio between the spot size of a focused spot and the spot size in a waveguide mode of the waveguide, and a coupling loss caused thereby in the slab waveguide according to the fourth embodiment. It can be seen from FIG. 15 that the coupling loss is greater as the ratio between the spot size of a focused spot and the spot size in a waveguide mode of the waveguide differs more from 1. Since the spot size of the focused spot is constant and the spot side in the waveguide mode varies when the waveguide width varies, waveguide widths $W_{m+a}$, $W_{m+a-1}$, $W_{m+a-2}$, ... of corresponding compensation waveguides $192_{m+a}$, $192_{m+a-1}$, $192_{m+a-2}$, ... are set to adjust the spot sizes of focused spots and the spot sizes in the waveguide mode of the waveguides. In this manner, waveguide widths $W_{m+a}$, $W_{m+a-1}$, $W_{m+a-2}$, ... of corresponding compensation waveguides $192_{m+a}$, $192_{m+a-1}$, $192_{m+a-2}$, ... are set to suitable values to set the intensities of optical signals propagated through compensation waveguides (output waveguides) $192_{m+a}$, $192_{m+a-1}$, $192_{m+a-2}$, ... to desired characteristics such as flat characteristics.

5th Embodiment

Figure 16:
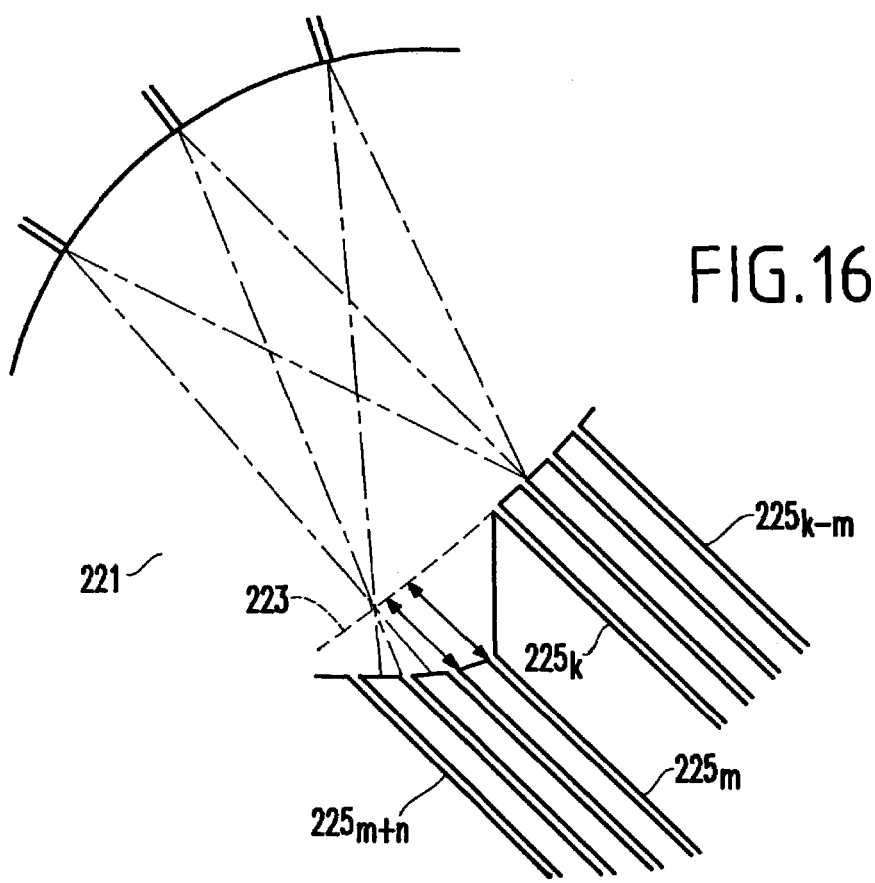
FIG. 16 is an enlarged fragmentary plan view of a portion of a slab waveguide of an arrayed waveguide grating according to a fifth embodiment of the present invention.

FIG. 16 shows in enlarged fragmentary plan a portion of a slab waveguide of an arrayed waveguide grating according to a fifth embodiment of the present invention. The arrayed waveguide grating according to the fifth embodiment has a structure which is basically the same as the conventional arrayed waveguide grating shown in FIG. 1. As shown in FIG. 16, output slab waveguide 221 according to the fifth embodiment has an output end partially projecting toward output waveguides from cophasal curve (a curve interconnecting output waveguide focusing positions $P_{m+n}$, $P_{m+n-1}$, $P_{m+n-2}$, ... or output waveguide focusing positions $P_{m+a}$, $P_{m+a-1}$, $P_{m+a-2}$, ... in the previous embodiment) 223 which interconnects the connected ends of non-compensation waveguides $222_k$ through $222_{k+n}$, and compensation waveguides $225_m$ through $225_{m+n}$ with light intensities compensated for are connected to the projecting portion of the output end. Specifically, the boundary between output slab waveguide 221 and compensation waveguides $225_m$ through $225_{m+n}$ partially projects from cophasal curve 223 toward the output waveguides. Instead of projecting from cophasal curve 223 toward the output waveguides, the output end of output slab waveguide 221 may be retracted toward the input end thereof.

Figure 17:
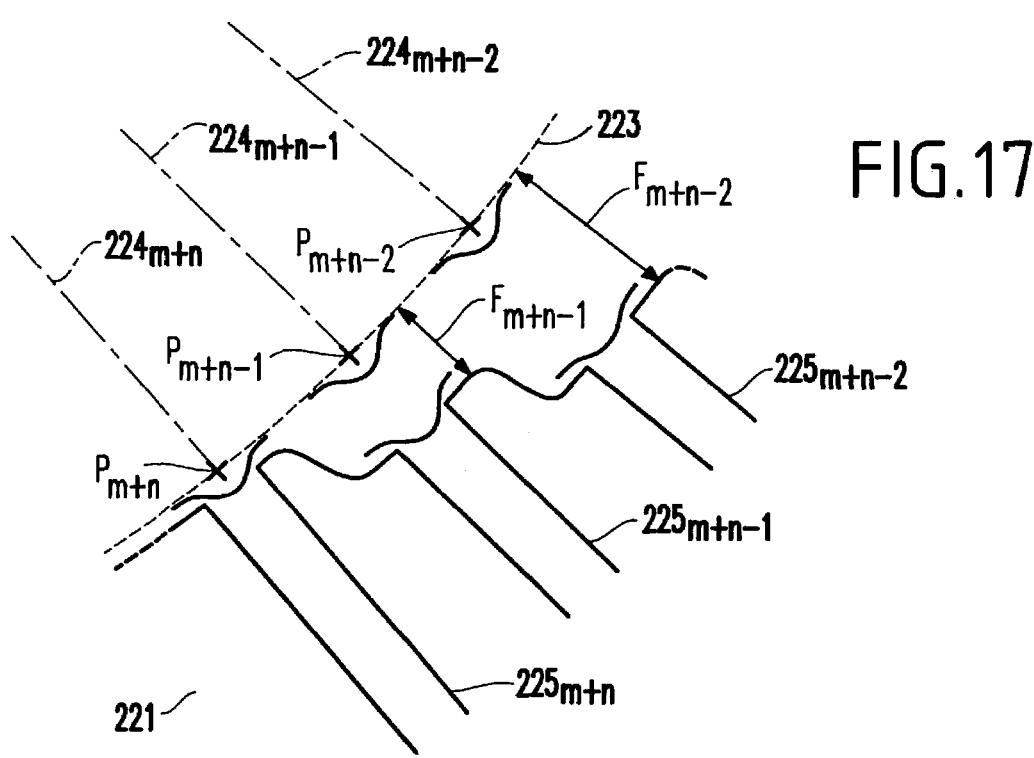
FIG. 17 is a view showing, in principle, optical losses caused by a projecting portion of the output end of the slab waveguide according to the fifth embodiment.

FIG. 17 shows, in principle, optical losses caused by such a projecting portion of the output end of the slab waveguide according to the fifth embodiment. Light which has propagated through optical path $224_{m+n}$ that interconnects the channel waveguide array, not shown, and output waveguide focusing position $P_{m+n}$ well matches compensation waveguide $225_{m+n}$ disposed at output waveguide focusing position $P_{m+n}$, and is propagated therethrough to the output end thereof. At this time, the intensity level of the light is not compensated for.

Light which has propagated through optical path $224_{m+n-1}$ that interconnects the channel waveguide array and output waveguide focusing position $P_{m+n-1}$ is focused at output waveguide focusing position $P_{m+n-1}$, but compensation waveguide $225_{m+n-1}$ is retracted by a given length (hereinafter referred to as "shifted focus distance") $F_{m+n-1}$ in the direction in which the light is output. Therefore, the light having a Gaussian intensity distribution at output waveguide focusing position $P_{m+n-1}$ is slightly distorted and propagated with an enlarged spot size through compensation waveguide $225_{m+n-1}$, causing a coupling loss due to a mismatch. Thus, by setting the shifted focus distance $F_{m+n-1}$ to a suitable value, it is possible to generate a coupling loss to cancel an increase in the light intensity caused at output waveguide focusing position $P_{m+n-1}$ as compared with output waveguide focusing position $P_{m+n}$, thereby adjusting the intensity level of light propagated through compensation waveguide $225_{m+n-1}$ to the same intensity level of light propagated through compensation waveguide $225_{m+n}$.

Compensation waveguide $225_{m+n-2}$ which is positioned adjacent to compensation waveguide $225_{m+n-1}$ toward the center is further retracted from corresponding output waveguide focusing position $P_{m+n-2}$ toward the output waveguide by a greater shifted focus distance $F_{m+n-2}$. Therefore, the coupling efficiency between output waveguide focusing position $P_{m+n-2}$ and compensation waveguide $225_{m+n-2}$ is further reduced from the coupling efficiency between output waveguide focusing position $P_{m+n-1}$ and compensation waveguide $225_{m+n-1}$. The intensity of light propagated through compensation waveguide $225_{m+n-2}$ can be equalized to the intensity of light propagated through compensation waveguide $225_{m+n-1}$ by setting the shifted focus distance $F_{m+n-2}$ to a suitable value. In this manner, the intensities of light propagated through all compensation waveguides $225_{m+n}$, $225_{m+n-1}$, $225_{m+n-2}$, ... can be equalized, thus providing flat output characteristics.

Figure 18:
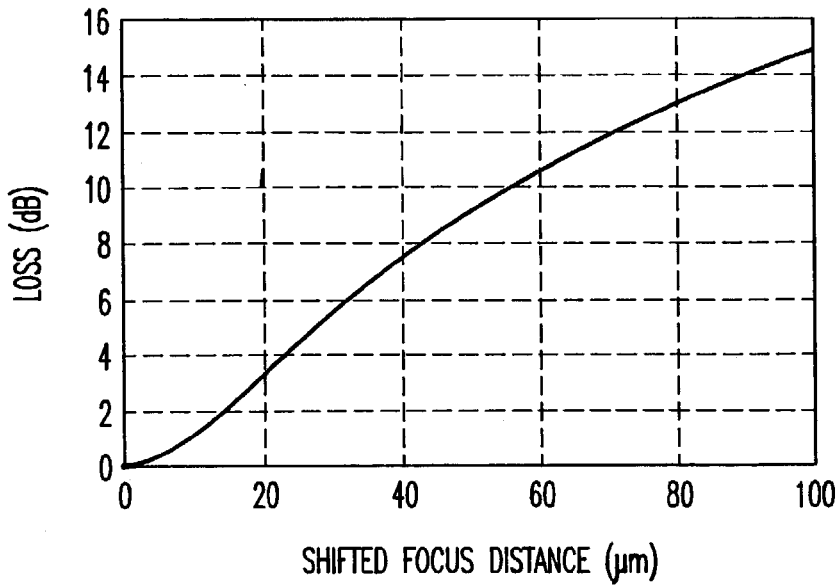
FIG. 18 is a diagram showing the relationship between a shifted focus distance F and a loss caused thereby in the slab waveguide according to the fifth embodiment.

FIG. 18 shows the relationship between a shifted focus distance F and a loss caused thereby in the slab waveguide according to the fifth embodiment. As with the previous embodiments, the fifth embodiment does not need to be limited to obtaining flat characteristics at the output end. Specifically, some arrayed waveguide gratings, or multiplexers or demultiplexers or optical communication systems which use arrayed waveguide gratings may not be required to have flat signal characteristics. For example, if amplifiers connected to the output ends of compensation waveguides $225_{m+n}$, $225_{m+n-1}$, $225_{m+n-2}$, ... do not have flat output characteristics, then it is necessary to design total output characteristics in view of the output characteristics of the amplifiers. Actually, therefore, the intensities of optical signals obtained by compensation waveguides $225_{m+n}$, $225_{m+n-1}$, $225_{m+n-2}$, . . . are compensated for according to the output characteristics that are needed.

Modifications of 1st Through 5th Embodiments

Figure 19:
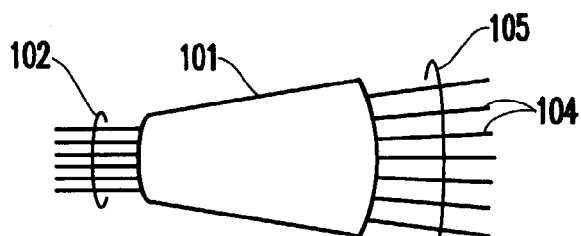
FIG. 19 is a view showing the manner in which optical signals can be multiplexed and demultiplexed using the arrayed waveguide grating according to the first embodiment.

FIG. 19 shows a general input/output relationship of a slab waveguide of an arrayed waveguide grating. In FIG. 19, those parts identical to those shown in FIG. 2 are denoted by identical reference numerals. In the first embodiment, optical signals from channel waveguide array 102 enter output slab waveguide 101, and demultiplexed optical signals are output from respective waveguides 104 of output waveguides 105. Conversely, waveguides 104 of output waveguides 105 may be used as input waveguides, and channel waveguide array 102 may be used as an output waveguide for multiplexing optical signals of various wavelengths or signals. Heretofore, it has been necessary to adjust the intensity levels of light at the input stage because the intensity levels of light entering from a relatively central region of output waveguides 105 are high. With output slab waveguide 101 according to the first embodiment being used as an inverted input/output configuration, such intensity levels do not need to be adjusted, and the signal levels of multiplexed signals can be brought into an appropriate range.

The arrangement for multiplying optical signals using the arrayed waveguide grating according to the first embodiment has been described above. However, the configuration shown in FIG. 19 is also applicable to the arrayed waveguide gratings according to the second through fifth embodiments for using these arrayed waveguide gratings as multiplexers for optical signals as well as demultiplexers for optical signals.

6th Embodiment

Figure 20:
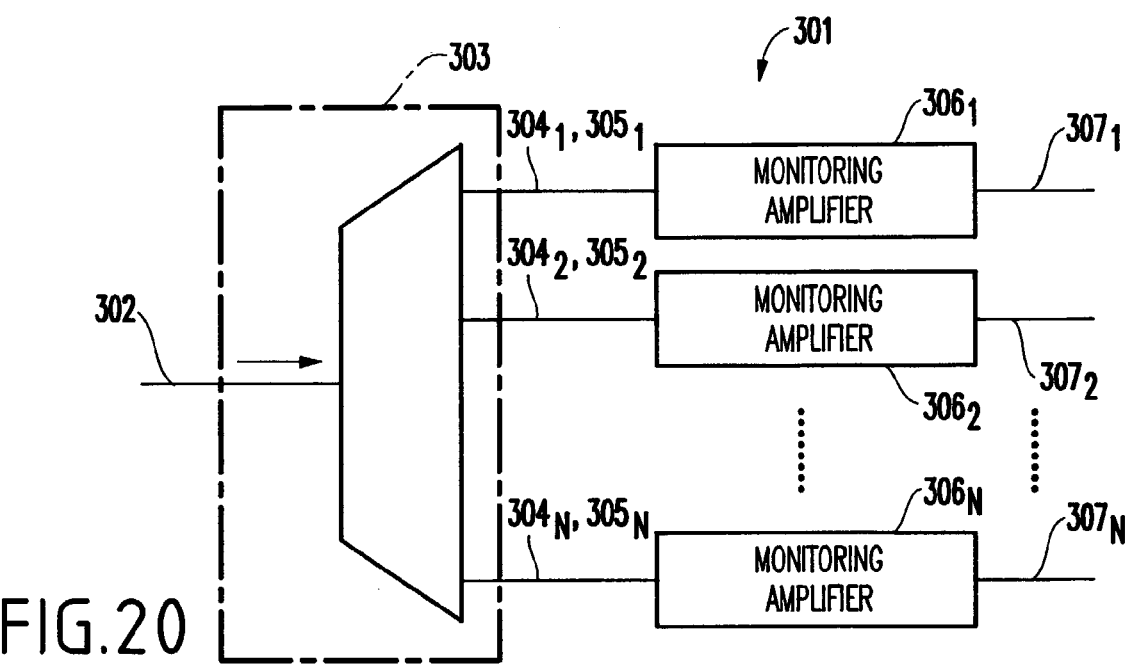
FIG. 20 is a block diagram of a demultiplexer according to a sixth embodiment of the present invention.

FIG. 20 shows in block form a demultiplexer according to a sixth embodiment of the present invention. As shown in FIG. 20, the demultiplexer, denoted by 301, has a waveguide device 303 for being supplied with optical signal 302. Waveguide device 303 may be any of the arrayed waveguide gratings according to the first through fifth embodiments. Waveguide device 303 demultiplexes a coupled optical signal and outputs demultiplexed optical signals $305_1$ through $305_N$ from respective output waveguides $304_1$ through $304_N$. Monitoring amplifiers $306_1$ through $306_N$ are connected to the respective output ends of output waveguides $304_1$ through $304_N$. Monitoring amplifiers $306_1$ through $306_N$ serve as AGC (Automatic Gain Control) circuits for detecting signal levels of corresponding optical signals $305_1$ through $305_N$ and amplifying or attenuating them to desired levels. Thus, optical signals $305_1$ through $305_N$ whose gains have been initially adjusted by waveguide device 303 are finally adjusted in gain by monitoring amplifiers $306_1$ through $306_N$, and output as optical signals $307_1$ through $307_N$ therefrom.

While it is possible for waveguide device 303 to make flat the levels of optical signals $305_1$ through $305_N$, monitoring amplifiers $306_1$ through $306_N$ are capable of adjusting the levels thereof even if the output characteristics of demultiplexer 301 as a whole are different from that of waveguide device 303.

7th Embodiment

Figure 21:
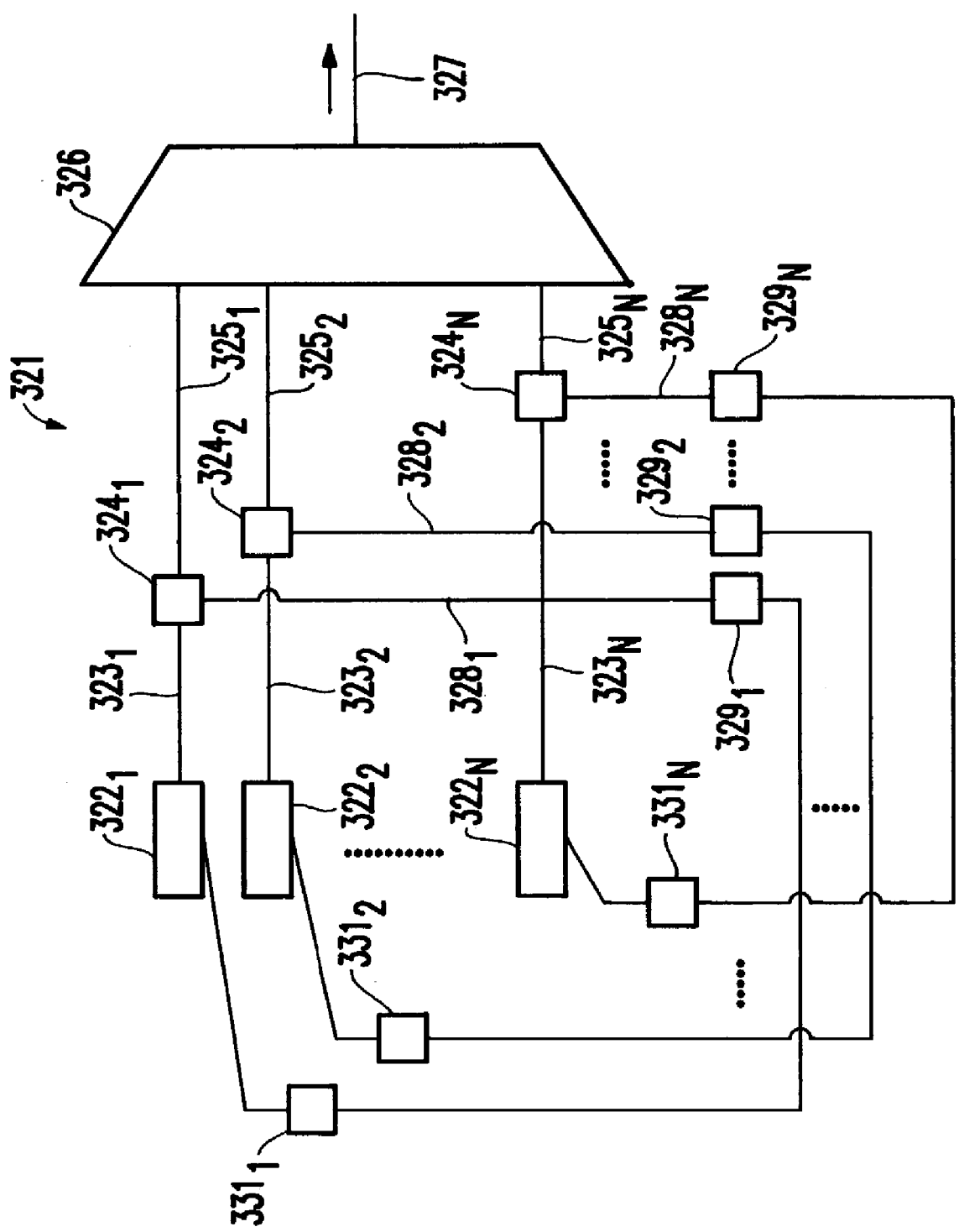
FIG. 21 is a block diagram of a multiplexer according to a seventh embodiment of the present invention.

FIG. 21 shows in block form a multiplexer according to a seventh embodiment of the present invention. As shown in FIG. 21, the multiplexer, denoted by 301, has a plurality of semiconductor lasers $322_1$ through $322_N$ for outputting optical signals of plural wavelengths. Optical signals $323_1$ through $323_N$ output from respective semiconductor lasers $322_1$ through $322_N$ are divided by dividers $324_1$ through $324_N$ into two groups of optical signals. Optical signals $325_1$ through $325_N$ of one group couple to waveguide device 326, which multiplexes optical signals $325_1$ through $325_N$ into optical signal 327 and outputs multiplexed optical signal 327.

Optical signals $328_1$ through $328_N$ of the other group which are divided by dividers $324_1$ through $324_N$ have their signal levels detected by respective level detectors $329_1$ through $329_N$, which may comprise photodiodes. Based on detected results from level detectors $329_1$ through $329_N$, drive controllers $331_1$ through $331_N$ associated with respective semiconductor lasers $322_1$ through $322_N$ control output levels of laser beams emitted therefrom. As a result, the levels of the optical signals of respective wavelengths, which make up optical signal 327 output from waveguide device 326, can be set to appropriate levels.

If waveguide device 326 has its output characteristics compensated for to output a multiplexed signal whose level is equal to the equal levels of the optical signals coupled thereto, then the output characteristics of the multiplexer 321 can be made flat without the use of drive controllers $331_1$ through $331_N$. However, drive controllers $331_1$ through $331_N$ are capable of adjusting output characteristics if the multiplexer 321 is required to have different output characteristics or make highly accurate level adjustments.

8th Embodiment

Figure 22:
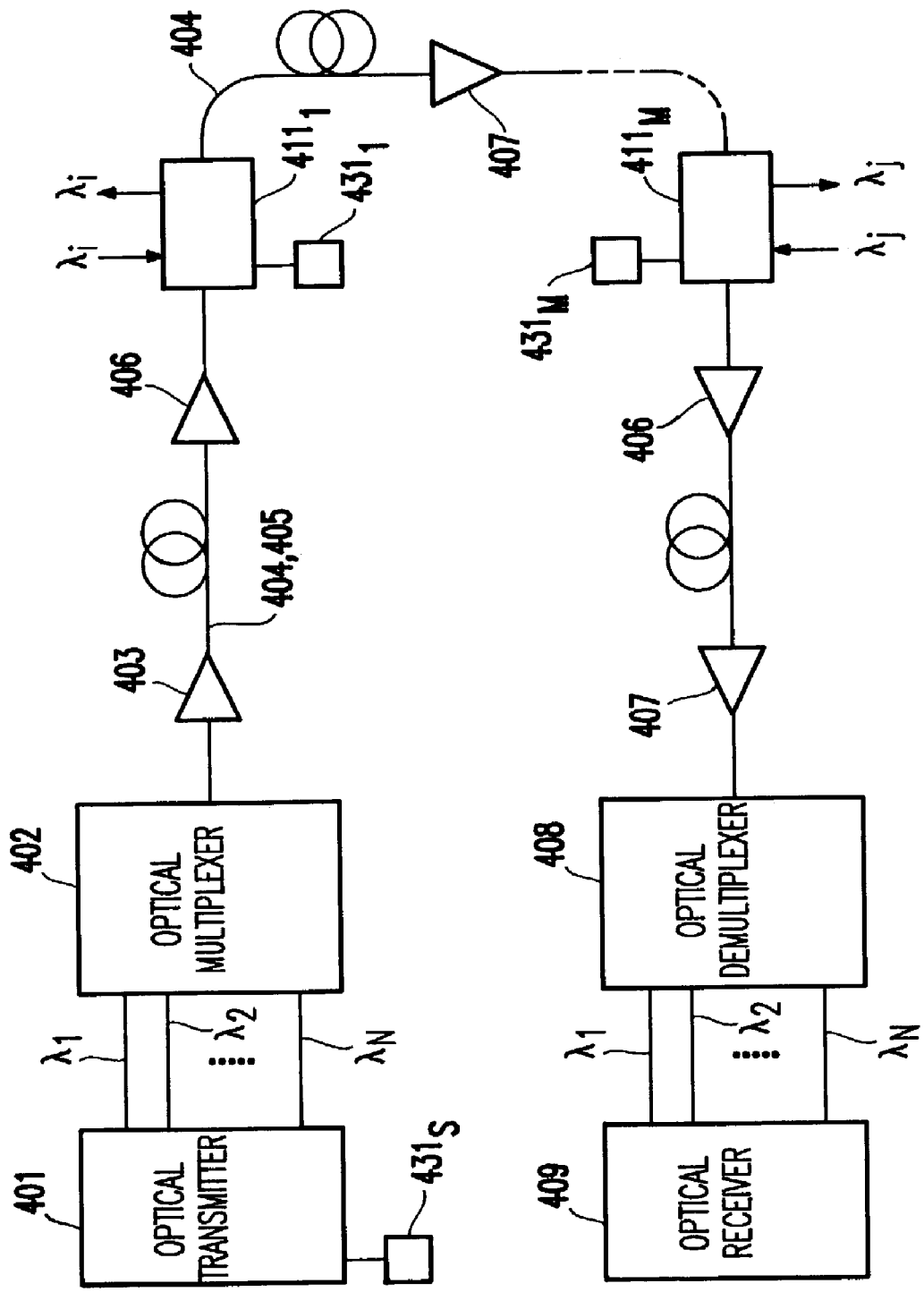
FIG. 22 is a block diagram of an optical communication system according to an eighth embodiment of the present invention.

FIG. 22 shows in block form an optical communication system according to an eighth embodiment of the present invention. The optical communication system has optical multiplexer (MUX) 402 which multiplexes optical signals of N channels having respective wavelengths $\lambda_1$ through $\lambda_N$ transmitted from optical transmitter 401 connected to a SONET (Synchronous Optical Network) system, not shown. A multiplexed optical signal 405 is amplified by booster amplifier 403 and delivered into optical transmission path 404. Optical multiplexer 402 comprise the arrayed waveguide grating according to the first embodiment. Multiplexed optical signal 405 is then amplified by in-line amplifiers 406, and applied via preamplifier 407 to optical demultiplexer (DMUX) 408, which demultiplexes multiplexed optical signal 405 into original optical signals having respective wavelengths $\lambda_1$ through $\lambda_N$, which are received by optical receiver 409. Optical transmission path 404 between in-line amplifiers 406 has a suitable number of nodes (OADM) $411_1$ through $411_M$. Optical signals of desired wavelengths are input to and output from these nodes $411_1$ through $411_M$.

Figure 23:
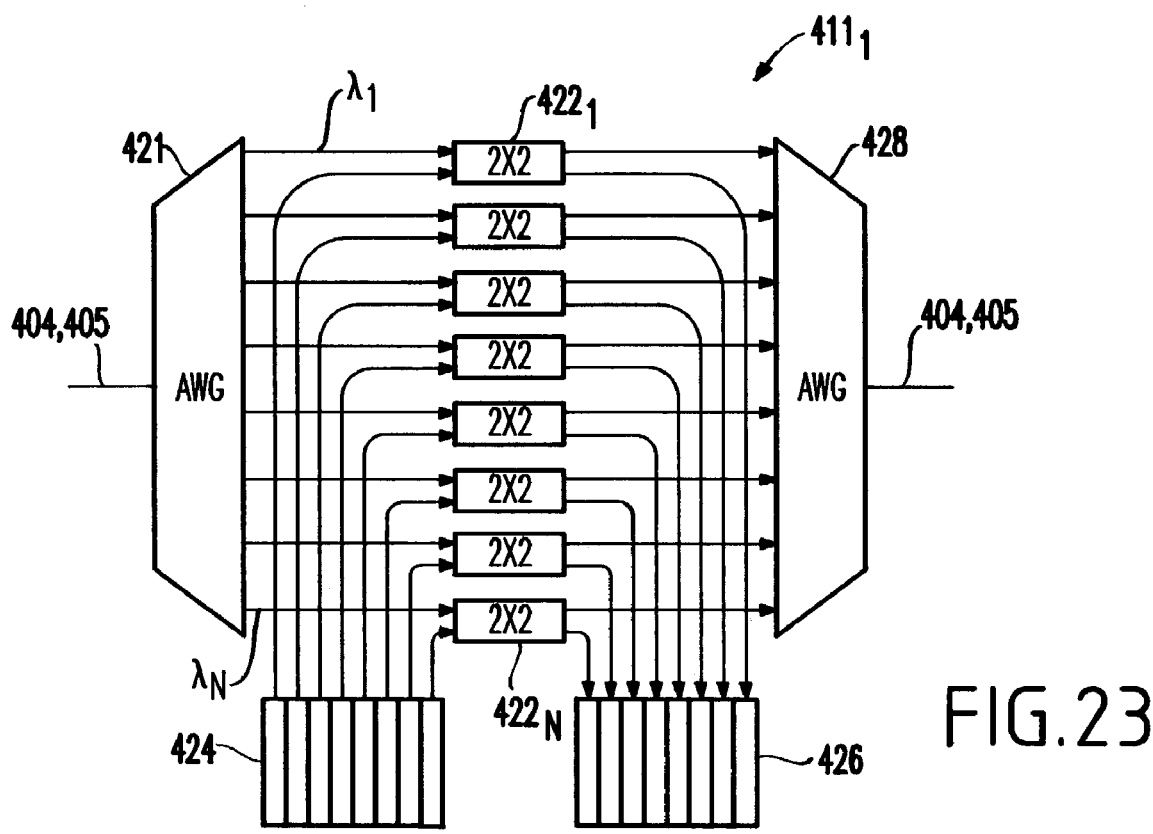
FIG. 23 is a block diagram of a node of the optical communication system according to the eighth embodiment.

FIG. 23 shows a node in block form. While first node $411_1$ is shown in FIG. 23, second through Mth nodes $411_2$ through $411_M$ are identical in structure to first node $411_1$. Optical signal transmitted over transmission path 404 shown in FIG. 22 is applied to input arrayed waveguide grating (AWG) 421 of first node $411_1$, which demultiplexes the optical signal into optical signals of N channels having respective wavelengths $\lambda_1$ through $\lambda_N$. The optical signals having respective wavelengths $\lambda_1$ through $\lambda_N$ are dropped into node receivers 426 by 2-input, 2-output optical switches $422_1$ through $422_N$ associated with respective wavelengths $\lambda_1$ through $\lambda_N$, and optical signals transmitted from node transmitters 424 are added to the optical signals having respective wavelengths $\lambda_1$ through $\lambda_N$. Optical signals output from 2-input, 2-output optical switches $422_1$ through $422_N$ are also directly input to output arrayed waveguide grating 428. Output arrayed waveguide grating 428 is a device which is a structural reversal of input arrayed waveguide grating 421, and multiplexes optical signals of N channels having respective wavelengths $\lambda_1$ through $\lambda_N$ into optical signal $420_5$, which is transmitted over an optical transmission path 404.

Heretofore, attenuators for respective wavelengths $\lambda_1$ through $\lambda_N$ are connected between 2-input, 2-output optical switches $422_1$ through $422_N$ and output arrayed waveguide grating 428 for eliminating signal level irregularities caused when multiplexed optical signal 405 passes through input arrayed waveguide grating 421 and signal level irregularities of optical signal 405 for respective wavelengths $\lambda_1$ through $\lambda_N$ which have been multiplexed by output arrayed waveguide grating 428. In the optical communication system according to the eighth embodiment, as described above with respect to the first embodiment and the modification of the first through fifth embodiments, input arrayed waveguide grating 421 and output arrayed waveguide grating 428 are capable of compensating for level variations between the waveguides. In the present embodiment, therefore, attenuators which have heretofore been required in applications where dynamic level compensation is not needed are not employed, and the requirement for dynamic range characteristics of the level compensators is reduced in applications where dynamic level compensation is needed.

First node 4111 shown in FIG. 23, and second through Mth nodes $411_2$ through $411_M$, optical multiplexer 402, and optical demultiplexer 408 shown in FIG. 22 employ arrayed waveguide gratings. Therefore, in view of a demand for an increased number of channels N for optical signal 405, it is important to stabilize the wavelengths of laser beams and monitor the output levels of the laser beams which are output in multiple channels from the output slab waveguides of the arrayed waveguide gratings. As shown in FIG. 22, nodes $411_1$ through $4111_M$ and optical transmitter 401 are associated with respective output monitoring control devices $431_1$ through $431_S$.

Modifications of 8th Embodiment

The eighth embodiment described above uses the arrayed waveguide grating according to the first embodiment. However, each of the arrayed waveguide gratings according to the second through fifth embodiments may be used in place of the arrayed waveguide grating according to the first embodiment in the eighth embodiment, providing a similar optical communication system. Furthermore, the multiplexer and the demultiplexer according to the sixth and seventh embodiments may be used instead of the above arrayed waveguide gratings.

Supplemental Description

The preferred embodiments of the present invention have been described above. According to the present invention, desired optical input/output characteristics are achieved by producing optical losses in the slab waveguide of the arrayed waveguide grating or the waveguide connected thereto (including individual waveguides of the channel waveguide array). One approach to achieving such desired optical input/output characteristics is to use the degree of matching of a focal point (9th and 10th aspects). The concept of a focal point in an arrayed waveguide grating will be described below.

Figure 24:
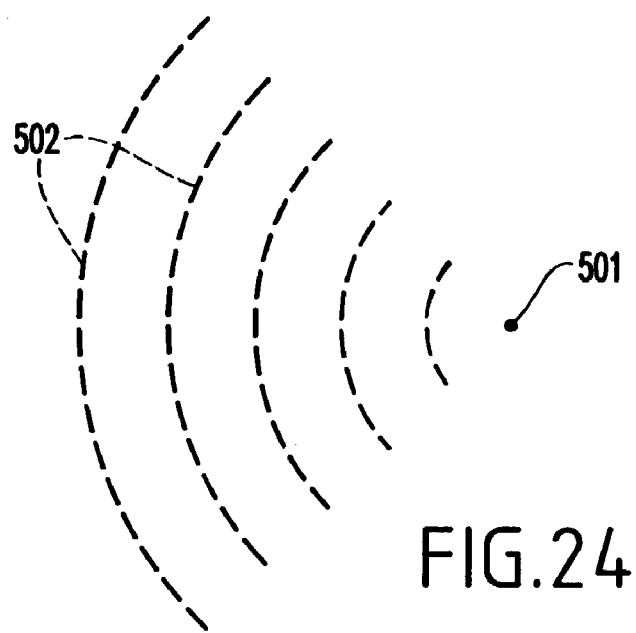
FIG. 24 is a diagram showing, in principle, of the concept of a focal point according to the present invention.

FIG. 24 shows the manner in which coherent light emitted from a light source is propagated. When light is emitted to the left in FIG. 24 from point light source 501, the light is spread with a cophasal surface as indicated by the dotted lines. Since all points on the cophasal surface are always spaced an equal distance from point light source 501, the cophasal surface is concentric to point light source 501.

If light whose cophasal surface is arcuate is radiated from the left to the right in FIG. 24, then it propagates in the opposite direction and is focused at point light source 501, which serves as a focal point. While point light source 501 does not exist in reality, if a light source can be regarded as being positioned sufficiently far in view of optical radiation and convergence, then a light source having a width or a length can be handled as point light source 501.

For example, channel waveguide array 15 shown in FIG. 1 is of a structure for confining light three-dimensionally with the core vertically sandwiched by the cladding layer. If such a channel waveguide array is positioned far enough, then it can be handled as point light source 501 and radiation and convergence of light emitted therefrom can be considered. In an arrayed waveguide grating, the exit of the channel waveguide array is disposed in a circumferential pattern. If the waveguides are cophasal at the exit of the channel waveguide array, then it is possible to generate light whose cophasal surface is approximately in a circumferential pattern and emit the light toward the center of the circumferential pattern. Thus, a focal point can be provided at the center of the circumferential pattern.

Even if the waveguides are not cophasal at the exit of the channel waveguide array, a focal point is provided at a position off the center of the circumferential pattern if the waveguides are out of phase with each other. With a demultiplexer-type arrayed waveguide grating, the wavelengths propagated through the respective waveguides of the channel waveguide array are out of phase with each other. Therefore, the optical signals of different wavelengths each other are focused at different positions in the output slab waveguide.

With a multiplexer-type arrayed waveguide grating, it is preferable to focus the optical signals of different wavelengths each other at the same position regardless of the different wavelengths each other. In this case, the positions where the optical signals are applied need to be changed depending on the wavelength thereof in order to cancel phase differences caused when the optical signals are propagated through the channel waveguide array.

While preferred embodiments of the present invention have been described using specific terms, such description is for illustrative purposes only, and it is to be understood that changes and variations may be made without departing from the spirit or scope of the appended claims.

What is claimed is:

1. An optical communication system comprising:
   optical transmitting means for transmitting optical signals of respective wavelengths parallel to each other;
   a multiplexer for wavelength-division multiplexing the optical signals of respective wavelengths transmitted by said optical transmitting means;
   an optical transmission path for transmitting a wavelength-division multiplexed optical signal output from said multiplexer;
   a node disposed in said optical transmission path and having an arrayed waveguide grating;
   a demultiplexer for being supplied with the optical signal transmitted over said optical transmission path via said node and demultiplexing the optical signal into the optical signals of respective wavelengths; and
   optical receiving means for receiving the optical signals of respective wavelengths demultiplexed by said demultiplexer, wherein said multiplexer comprises an arrayed waveguide grating comprising:
  a plurality of input waveguides for inputting signal lights having different wavelengths from a light source;
  one or plural output waveguides for outputting signal lights;
  a channel waveguide array having waveguides which are successively longer with predetermined waveguide length differences;
  an output slab waveguide connecting an output end of said channel waveguide array to said output waveguides; and
  an input slab waveguide connecting an input end of said channel waveguide array to said input waveguides, and having optical input/output characteristics set to predetermined ratios for the respective input waveguides with respect to the output waveguides,
wherein said output waveguides are configured such that an output level of said signal lights is adjusted in the arrayed waveguide grating of said multiplexer,
wherein said demultiplexer comprises an arrayed waveguide grating comprising:
  one or plural input waveguides for inputting signal lights;
  a plurality of output waveguides for outputting signal lights;
  a channel waveguide array having waveguides which are successively longer with predetermined waveguide length differences;
  an input slab waveguide connecting an input end of said channel waveguide array to said input waveguides; and
  an output slab waveguide connecting an output end of said channel waveguide array to said output waveguides, and having optical input/output characteristics set to predetermined ratios for the respective output waveguides with respect to said input waveguides,
wherein said output waveguides are configured such that an output level of said signal lights is adjusted in the arrayed waveguide grating of said demultiplexer, and
wherein a central axis of at least one of said output waveguides are out of alignment with a remainder of said output waveguides.

2. An optical communication system comprising:
optical transmitting means for transmitting optical signals of respective wavelengths parallel to each other;
a multiplexer for wavelength-division multiplexing the optical signals of respective wavelengths transmitted by said optical transmitting means;
an optical transmission path for transmitting a wavelength-division multiplexed optical signal output from said multiplexer;
a node disposed in said optical transmission path and having an arrayed waveguide grating;
a demultiplexer for being supplied with the optical signal transmitted over said optical transmission path via said node and demultiplexing the optical signal into the optical signals of respective wavelengths; and
optical receiving means for receiving the optical signals of respective wavelengths demultiplexed by said demultiplexer,
wherein said multiplexer comprises an arrayed waveguide grating comprising:
  a plurality of input waveguides for inputting signal lights having different wavelengths;
  one or plural output waveguides for outputting signal lights;
  a channel waveguide array having waveguides which are successively longer with predetermined waveguide length differences;
  an output slab waveguide connecting an output end of said channel waveguide array to said output waveguides; and
  an input slab waveguide connecting an input end of said channel waveguide array to said input waveguides, and having optical input/output characteristics set to predetermined ratios for the respective input waveguides with respect to the output waveguides depending on the differences between optical losses along respective paths in the output slab waveguide,
wherein said output waveguides are configured such that an output level of said signal lights is adjusted in the arrayed waveguide grating of said multiplexer,
wherein said demultiplexer comprises an arrayed waveguide grating comprising:
  one or plural input waveguides for inputting signal lights;
  a plurality of output waveguides for outputting signal lights;
  a channel waveguide array having waveguides which are successively longer with predetermined waveguide length differences;
  an input slab waveguide connecting an input end of said channel waveguide array to said input waveguides; and
  an output slab waveguide connecting an output end of said channel waveguide array to said output waveguides, and having optical input/output characteristics set to predetermined ratios for the respective output waveguides with respect to said input waveguides depending on the differences between optical losses along respective paths in the output slab waveguide,
wherein said output waveguides are configured such that an output level of said signal lights is adjusted in the arrayed waveguide grating of said demultiplexer, and
wherein a central axis of at least one of said output waveguides are out of alignment with a remainder of said output waveguides.

3. An optical communication system comprising:
an annular transmission path having a plurality of nodes interconnected in a ring by a transmission path, for transmitting a wavelength-division multiplexed optical signal over the transmission path;
each of said nodes having a first arrayed waveguide grating for demultiplexing a wavelength-division multiplexed optical signal into optical signals of respective wavelengths, and a second arrayed waveguide grating for wavelength-division multiplexing the demultiplexed optical signals of respective wavelengths,
wherein said first arrayed waveguide grating comprises:
  one or plural input waveguides for inputting signal lights;
  a plurality of output waveguides for outputting signal lights;
  a channel waveguide array having waveguides which are successively longer with predetermined waveguide length differences;

an input slab waveguide connecting an input end of said channel waveguide array to said input waveguides; and an output slab waveguide connecting an output end of said channel waveguide array to said output waveguides, and having optical input/output characteristics set to predetermined ratios for the respective output waveguides with respect to said input waveguides, wherein said output waveguides are configured such that an output level of said signal lights is adjusted in the first arrayed waveguide grating, wherein said second arrayed waveguide grating comprises:

a plurality of input waveguides for inputting signal lights having different wavelengths each other;

one or plural output waveguides for outputting signal lights;

a channel waveguide array having waveguides which are successively longer with predetermined waveguide length differences;

an output slab waveguide connecting an output end of said channel waveguide array to said output waveguides; and an input slab waveguide connecting an input end of said channel waveguide array to said input waveguides, and having optical input/output characteristics set to predetermined ratios for the respective input waveguides corresponding to the output waveguides, wherein said output waveguides are configured such that an output level of said signal lights is adjusted in the second arrayed waveguide grating, and wherein a central axis of at least one of said output waveguides are out of alignment with a remainder of said output waveguides.

4. An optical communication system comprising:

an annular transmission path having a plurality of nodes interconnected in a ring by a transmission path, for transmitting a wavelength-division multiplexed optical signal over the transmission path, wherein each of said nodes having a first arrayed waveguide grating for demultiplexing a wavelength-division multiplexed optical signal into optical signals of respective wavelengths, and a second arrayed waveguide grating for multiplexing the demultiplexed optical signals of respective wavelengths, wherein said first arrayed waveguide grating comprises:

one or plural input waveguides for inputting signal lights;

a plurality of output waveguides for outputting signal lights;

a channel waveguide array having waveguides which are successively longer with predetermined waveguide length differences;

an input slab waveguide connecting an input end of said channel waveguide array to said input waveguides; and an output slab waveguide connecting an output end of said channel waveguide array to said output waveguides, and having optical input/output characteristics set to predetermined ratios for the respective output waveguides with respect to said input waveguides depending on the differences between optical losses along respective paths in the output slab waveguide, wherein said output waveguides are configured such that an output level of said signal lights is adjusted in the first arrayed waveguide grating, wherein said second arrayed waveguide grating comprises:

a plurality of input waveguides for inputting signal lights having different wavelengths each other;

one or plural output waveguides for outputting signal lights;

a channel waveguide array having waveguides which are successively longer with predetermined waveguide length differences;

an output slab waveguide connecting an output end of said channel waveguide array to said output waveguides; and an input slab waveguide connecting an input end of said channel waveguide array to said input waveguides, and having optical input/output characteristics set to predetermined ratios for the respective input waveguides corresponding to the output waveguides depending on the differences between optical losses along respective paths in the output slab waveguide, wherein said output waveguides are configured such that an output level of said signal lights is adjusted in the second arrayed waveguide grating, and wherein a central axis of at least one of said output waveguides are out of alignment with a remainder of said output waveguides.

5. An optical communication system comprising:

optical transmitting means for transmitting optical signals of respective wavelengths parallel to each other;

a multiplexer for wavelength-division multiplexing the optical signals of respective wavelengths transmitted by said optical transmitting means;

an optical transmission path for transmitting a wavelength-division multiplexed optical signal output from said multiplexer;

a node disposed in said optical transmission path;

a demultiplexer for being supplied with the optical signal transmitted over said optical transmission path via said node and demultiplexing the optical signal into the optical signals of respective wavelengths; and optical receiving means for receiving the optical signals of respective wavelengths demultiplexed by said demultiplexer, wherein said multiplexer comprises an arrayed waveguide grating comprising:

a plurality of input waveguides for inputting signal lights having different wavelengths;

one or plural output waveguides for outputting signal lights;

a channel waveguide array having waveguides which are successively longer with predetermined waveguide length differences;

an output slab waveguide connecting an output end of said channel waveguide array to said output waveguides;

an input slab waveguide connecting an input end of said channel waveguide array to said input waveguides, and having optical input/output characteristics set to predetermined ratios for the respective input waveguides corresponding to the output waveguides; and level detecting means for detecting levels of the signal lights input to said arrayed waveguide grating; and level adjusting means for comparing the levels of the signal lights detected by said level detecting means with predetermined levels for the respective wavelengths, and adjusting output levels of the light signals to set the levels of the waveguides multiplexed by said arrayed waveguide grating to desired values, and wherein said demultiplexer comprises an arrayed waveguide grating comprising:
  one or plural input waveguides for inputting signal lights;
  a plurality of output waveguides for outputting signal light;
  a channel waveguide array having waveguides which are successively longer with predetermined waveguide length differences;
  an input slab waveguide connecting an input end of said channel waveguide array to said input waveguides;
  an output slab waveguide connecting an output end of said channel waveguide array to said output waveguides, and having optical input/output characteristics set to predetermined ratios for the respective output waveguides with respect to said input waveguides; and
  level adjusting means for being supplied with the signal lights of respective wavelengths from the output waveguides of said arrayed waveguide grating, and adjusting output levels of said signal lights to desired values.

6. An optical communication system comprising:
optical transmitting means for transmitting optical signals of respective wavelengths parallel to each other;
a multiplexer for wavelength-division multiplexing the optical signals of respective wavelengths transmitted by said optical transmitting means;
an optical transmission path for transmitting a wavelength-division multiplexed optical signal output from said multiplexer;
a node disposed in said optical transmission path;
a demultiplexer for being supplied with the optical signal transmitted over said optical transmission path via said node and demultiplexing the optical signal into the optical signals of respective wavelengths; and
optical receiving means for receiving the optical signals of respective wavelengths demultiplexed by said demultiplexer,
wherein said multiplexer comprises an arrayed waveguide grating comprising:
  a plurality of input waveguides for inputting signal lights having different wavelengths;
  one or plural output waveguides for outputting signal lights;
  a channel waveguide array having waveguides which are successively longer with predetermined waveguide length differences;
  an output slab waveguide connecting an output end of said channel waveguide array to said output waveguides;
  an input slab waveguide connecting an input end of said channel waveguide array to said input waveguides, and having optical input/output characteristics set to predetermined ratios for the respective input waveguides corresponding to the output waveguides depending on the differences between optical losses along respective paths in the output slab waveguide;

level detecting means for detecting levels of the signal lights input to said arrayed waveguide grating; and
level adjusting means for comparing the levels of the signal lights detected by said level detecting means with predetermined levels for the respective wavelengths, and adjusting output levels of the signal lights to set the levels of the waveguides multiplexed by said arrayed waveguide grating to desired values, and wherein said demultiplexer comprises an arrayed waveguide grating comprising:
  one or plural input waveguides for inputting signal lights;
  a plurality of output waveguides for outputting signal lights;
  a channel waveguide array having waveguides which are successively longer with predetermined waveguide length differences;
  an input slab waveguide connecting an input end of said channel waveguide array to said input waveguides;
  an output slab waveguide connecting an output end of said channel waveguide array to said output waveguides, and having optical input/output characteristics set to predetermined ratios for the respective output waveguides with respect to said input waveguides depending on the differences between optical losses along respective paths in the output slab waveguide; and
  level adjusting means for being supplied with the signal lights of respective wavelengths from the output waveguides of said arrayed waveguide grating, and adjusting output levels of said signal lights to desired values.

7. An optical communication system comprising:
an annular transmission path having a plurality of nodes interconnected in a ring by a transmission path, for transmitting a wavelength-division multiplexed optical signal over the transmission path,
wherein each of said nodes having a demultiplexer for demultiplexing a wavelength-division multiplexed optical signal into optical signals of respective wavelengths, and a multiplexer for wavelength-division multiplexing the demultiplexed optical signals of respective wavelengths,
wherein said demultiplexer comprising an arrayed waveguide grating comprising:
  one or plural input waveguides for inputting signal lights;
  a plurality of output waveguides for outputting signal lights;
  a channel waveguide array having waveguides which are successively longer with predetermined waveguide length differences;
  an input slab waveguide connecting an input end of said channel waveguide array to said input waveguides;
  an output slab waveguide connecting an output end of said channel waveguide array to said output waveguides, and having optical input/output characteristics set to predetermined ratios for the respective output waveguides with respect to said input waveguides; and
  level adjusting means for being supplied with the signal lights of respective wavelengths from the output waveguides of said arrayed waveguide grating, and adjusting output levels of said signal lights to desired values, and wherein said multiplexer comprises an arrayed waveguide grating comprising:
- a plurality of input waveguides for inputting signal lights having different wavelengths;
- one or plural output waveguides for outputting signal lights;
- a channel waveguide array having waveguides which are successively longer with predetermined waveguide length differences;
- an output slab waveguide connecting an output end of said channel waveguide array to said output waveguides;
- an input slab waveguide connecting an input end of said channel waveguide array to said input waveguides, and having optical input/output characteristics set to predetermined ratios for the respective input waveguides corresponding to the output waveguides;
- level detecting means for detecting levels of the signal lights input to said arrayed waveguide grating; and
- level adjusting means for comparing the levels of the signal lights detected by said level detecting means with predetermined levels for the respective wavelengths, and adjusting output levels of the light signals to set the levels of the waveguides multiplexed by said arrayed waveguide grating to desired values.

8. An optical communication system comprising:

an annular transmission path having a plurality of nodes interconnected in a ring by a transmission path, for transmitting a wavelength-division multiplexed optical signal over the transmission path, wherein each of said nodes having a demultiplexer for demultiplexing a wavelength-division multiplexed optical signal into optical signals of respective wavelengths, and a multiplexer for frequency-division multiplexing the demultiplexed optical signals of respective wavelengths, wherein said demultiplexer comprises an arrayed waveguide grating comprising:
- one or plural input waveguides for inputting signal lights;
- a plurality of output waveguides for outputting signal lights;
- a channel waveguide array having waveguides which are successively longer with predetermined waveguide length differences;
- an input slab waveguide connecting an input end of said channel waveguide array to said input waveguides;
- an output slab waveguide connecting an output end of said channel waveguide array to said output waveguides, and having optical input/output characteristics set to predetermined ratios for the respective output waveguides with respect to said input waveguides depending on the differences between optical losses along respective paths in the output slab waveguide;
- level adjusting means for being supplied with the signal lights of respective wavelengths from the output waveguides of said arrayed waveguide grating, and adjusting output levels of said signal lights to desired values, and wherein said multiplexer comprising an arrayed waveguide grating comprising:
- a plurality of input waveguides for inputting signal lights having different wavelengths;
- one or plural output waveguides for outputting signal lights;
- a channel waveguide array having waveguides which are successively longer with predetermined waveguide length differences;
- an output slab waveguide connecting an output end of said channel waveguide array to said output waveguides;
- an input slab waveguide connecting an input end of said channel waveguide array to said input waveguides, and having optical input/output characteristics set to predetermined ratios for the respective input waveguides corresponding to the output waveguides depending on the differences between optical losses along respective paths in the output slab waveguide;
- level detecting means for detecting levels of the signal lights input to said arrayed waveguide grating; and
- level adjusting means for comparing the levels of the signal lights detected by said level detecting means with predetermined levels for the respective wavelengths, and adjusting output levels of the signal lights to set the levels of the waveguides multiplexed by said arrayed waveguide grating to desired values.

9. An optical communication system comprising:

optical transmitting means for transmitting optical signals of respective wavelengths parallel to each other;

a multiplexer for wavelength-division multiplexing the optical signals of respective wavelengths transmitted by said optical transmitting means;

an optical transmission path for transmitting a wavelength-division multiplexed optical signal output from said multiplexer;

a node disposed in said optical transmission path and having a waveguide device;

a demultiplexer for being supplied with the optical signal transmitted over said optical transmission path via said node and demultiplexing the optical signal into the optical signals of respective wavelengths; and optical receiving means for receiving the optical signals of respective wavelengths demultiplexed by said demultiplexer, wherein said multiplexer comprises:
- a plurality of input waveguides for inputting signal lights;
- one or plural output waveguides for outputting signal lights; and
- a slab waveguide having optical input/output characteristics set to predetermined ratios for the respective input waveguides with respect to the output waveguides, wherein said output waveguides are configured such that an output level of said signal lights is adjusted in the arrayed waveguide grating of said multiplexer, wherein said demultiplexer comprises a waveguide device comprising:
- one or plural input waveguides for inputting signal lights;
- a plurality of output waveguides for outputting signal lights; and a slab waveguide having optical input/output characteristics set to predetermined ratios for the respective output waveguides with respect to said input waveguides, wherein said output waveguides are configured such that an output level of said signal lights is adjusted in the arrayed waveguide grating of said demultiplexer, and wherein a central axis of at least one of said output waveguides are out of alignment with a remainder of said output waveguides.

10. An optical communication system comprising:

an annular transmission path having a plurality of nodes interconnected in a ring by a transmission path, for transmitting a wavelength-division multiplexed optical signal over the transmission path, wherein each of said nodes having a first waveguide device for demultiplexing a wavelength-division multiplexed optical signal into optical signals of respective wavelengths, and a second waveguide device for wavelength-division multiplexing the demultiplexed optical signals of respective wavelengths, wherein said first waveguide device comprising:
one or plural input waveguides for inputting signal lights;
a plurality of output waveguides for outputting signal lights; and
a slab waveguide having optical input/output characteristics set to predetermined ratios for the respective output waveguides with respect to said input waveguides, wherein said output waveguides are configured such that an output level of said signal lights is adjusted in the arrayed waveguide grating of said multiplexer, wherein said second waveguide device comprises:
a plurality of input waveguides for inputting signal lights;
one or plural output waveguides for outputting signal lights; and
a slab waveguide having optical input/output characteristics set to predetermined ratios for the respective input waveguides with respect to the output waveguides, wherein said output waveguides are configured such that an output level of said signal lights is adjusted in the arrayed waveguide grating of said demultiplexer, and wherein a central axis of at least one of said output waveguides are out of alignment with a remainder of said output waveguides.

11. An optical communication system comprising:

optical transmitting means for transmitting optical signals of respective wavelengths parallel to each other;

a multiplexer for wavelength-division multiplexing the optical signals of respective wavelengths transmitted by said optical transmitting means;

an optical transmission path for transmitting a wavelength-division multiplexed optical signal output from said multiplexer;

a node disposed in said optical transmission path;

a demultiplexer for being supplied with the optical signal transmitted over said optical transmission path via said node and demultiplexing the optical signal into the optical signals of respective wavelengths; and optical receiving means for receiving the optical signals of respective wavelengths demultiplexed by said demultiplexer, wherein said multiplexer comprises a plurality of light sources for respective signals, and a waveguide device comprising:
a plurality of input waveguides for inputting signal lights;
one or plural output waveguides for outputting signal lights; and
a slab waveguide having optical input/output characteristics set to predetermined ratios for the respective input waveguides with respect to the output waveguides;
level detecting means for detecting levels of the signal lights input from said light sources to said waveguide device; and
level adjusting means for comparing the levels of the signal lights detected by said level detecting means with predetermined levels for the respective signal lights, and adjusting output levels of the respective signal lights to set the levels of the signal lights multiplexed by said waveguide device to desired values, and wherein said demultiplexer comprising a waveguide device comprising:
one or plural input waveguides for inputting signal lights;
a plurality of output waveguides for outputting signal lights; and
a slab waveguide having optical input/output characteristics set to predetermined ratios for the respective output waveguides with respect to the input waveguides; and
level adjusting means for being supplied with the signal lights from the output waveguides of said waveguide device, and adjusting output levels of said signal lights to desired values.

12. An optical communication system comprising:

an annular transmission path having a plurality of nodes interconnected in a ring by a transmission path, for transmitting a wavelength-division multiplexed optical signal over the transmission path, wherein each of said nodes having a demultiplexer for demultiplexing a multiplexed optical signal into optical signals of respective wavelengths, and a multiplexer for wavelength-division multiplexing the demultiplexed optical signals of respective wavelengths, wherein said demultiplexer comprises a waveguide device comprising:
one or plural input waveguides for inputting signal lights;
a plurality of output waveguides for outputting signal lights; and
a slab waveguide having optical input/output characteristics set to predetermined ratios for the respective output waveguides with respect to the input waveguides; and
level adjusting means for being supplied with the signal lights from the output waveguides of said waveguide device, and adjusting output levels of said signal lights to desired values, and wherein said multiplexer comprises a plurality of light sources for respective signals, and a waveguide device comprising:
a plurality of input waveguides for inputting signal lights;
one or plural output waveguides for outputting signal lights; and a slab waveguide having optical input/output characteristics set to predetermined ratios for the respective input waveguides with respect to the output waveguides;

level detecting means for detecting levels of the signal lights input from said light sources to said waveguide device; and level adjusting means for comparing the levels of the signal lights detected by said level detecting means with predetermined levels for the respective signal lights, and adjusting output levels of the respective signal lights to set the levels of the signal lights multiplexed by said waveguide device to desired values.

13. The optical communication system of claim 1, wherein said input slab waveguide of said multiplexer comprises a core layer disposed therein for propagating light therethrough, said core layer being partly cut off in selected paths therein, which interconnect said channel waveguide array and said plurality of input waveguides.

14. The optical communication system of claim 1, wherein said output slab waveguide of said demultiplexer includes a core layer disposed therein for propagating light therethrough, said core layer being partly cut off in selected paths therein, which interconnect said channel waveguide array and said plurality of output waveguides.

15. The optical communication system of claim 1, wherein a central axis of a selected output waveguide is displaced along a direction perpendicular to said central axis of said selected output waveguide from a corresponding focusing position by a predetermined value to attenuate said signal light intensity.

16. The optical communication system of claim 1, wherein a central axis of a selected output waveguide is inclined from a perpendicular to a surface of an output end of said output waveguide at a focusing position to attenuate said signal light intensity.

17. The optical communication system of claim 1, wherein a diameter of a selected output waveguide is changed at a focusing position to adjust said signal light intensity.

18. The optical communication system of claim 1, wherein said output end of said output slab waveguide partially projects toward ends of selected output waveguides from a cophasal plane of corresponding focusing positions, an end of a selected output waveguide is displaced along it propagation axis by a shifted focus distance in a direction away from said cophasal plane to attenuate said signal light intensity.

19. The optical communication system of claim 1, wherein said input slab waveguide of said multiplexer includes a cladding layer being disposed in cut regions of said core layer and on opposite sides of said core layer, said cut regions in said selected optical paths including cut lengths set to predetermined values in a direction in which said signal lights propagate to attenuate said signal light intensity.

20. The optical communication system of claim 13, wherein said output slab waveguide of said demultiplexer includes a cladding layer being disposed in cut regions of said core layer and on opposite sides of said core layer, said cut regions in said selected optical paths including cut lengths set to predetermined values in a direction in which said signal lights propagate to attenuate said signal light intensity.

21. The optical communication system according to claim 1, wherein said output waveguide comprises ports that are disposed with a displaced angular spacing.

22. The optical communication system according to claim 5, wherein said level adjusting means in said multiplexer comprises a configuration of said output waveguides in said multiplexer, and wherein said level adjusting means in said demultiplexer comprises a configuration of said output waveguides in said demultiplexer.

* * * * *